US012699707B2

(12) United States Patent
McKean et al.

(10) Patent No.: US 12,699,707 B2
(45) Date of Patent: Aug. 4, 2026

(54) GENERATIVE MACHINE LEARNING METHODS FOR ADAPTIVE TARGET LEARNING SYSTEMS

(71) Applicant: REACH Pathways L3C, Chicago, IL (US)

(72) Inventors: Brooke McKean, Chicago, IL (US); Kenneth Woodard, Chicago, IL (US); Eric Smith, Chicago, IL (US); Sasha Peña, Chicago, IL (US); Jeffery Beckham, Jr., Chicago, IL (US)

(73) Assignee: REACH Pathways L3C, Chicago, IL (US)

( * ) Notice: Subject to any disclaimer, the term of this patent is extended or adjusted under 35 U.S.C. 154(b) by 0 days.

(21) Appl. No.: 19/353,796

(22) Filed: Oct. 9, 2025

(65) Prior Publication Data

US 2026/0195339 A1 Jul. 9, 2026

Related U.S. Application Data

(60) Provisional application No. 63/742,162, filed on Jan. 6, 2025.

(51) Int. Cl.
*G06F 16/26* (2019.01)
*G06F 3/0481* (2022.01)
(Continued)

(52) U.S. Cl.
CPC ............ *G06F 16/26* (2019.01); *G06F 3/0481* (2013.01); *G06F 3/04842* (2013.01); *G09B 5/02* (2013.01)

(58) Field of Classification Search
CPC .... G06F 16/26; G06F 3/0481; G06F 3/04842; G09B 5/02
See application file for complete search history.

(56) References Cited

U.S. PATENT DOCUMENTS

2014/0245184 A1* 8/2014 Cheng ................... G06Q 50/01
715/753
2016/0155346 A1* 6/2016 Wang ....................... G06N 5/04
434/353

(Continued)

*Primary Examiner* — Kieu D Vu
*Assistant Examiner* — Alvaro R Calderon, IV
(74) *Attorney, Agent, or Firm* — Perkins Coie LLP

(57) ABSTRACT

Systems and methods are disclosed comprising techniques for dynamically generating memory nodes storing recommended operations for validating learning features, such as displaying a graph structure comprising acyclic sequences of memory nodes storing interactive elements, receiving an execution signal indicating user execution of the recommended operations where the execution signal comprises performance measures associated with usage of the interactive elements, accessing stored historical records comprising prior performance measures associated with prior user execution of recommended operations to validate prior learning features when the performance measures satisfy a tolerance threshold, input the performance measures and the prior performance measures into a generative machine learning model to generate a second target learning feature and recommended operations to validate the second target learning feature, determining interactive elements that cause the second recommended operations, and adjusting the graph structure to display a second memory node within the acyclic sequences of memory nodes.

20 Claims, 10 Drawing Sheets

(51) Int. Cl.
    *G06F 3/04842*     (2022.01)
    *G09B 5/02*     (2006.01)

(56)       References Cited

U.S. PATENT DOCUMENTS

| | | | |
|---|---|---|---|
| 2017/0017903 A1* | 1/2017 | Gray | G06T 11/60 |
| 2022/0400092 A1* | 12/2022 | Orkin | G06N 7/01 |
| 2023/0360549 A1* | 11/2023 | LeBlanc | G09B 5/02 |
| 2025/0285056 A1* | 9/2025 | Birru | G06Q 10/0633 |

* cited by examiner

GENERATIVE MACHINE LEARNING METHODS FOR ADAPTIVE TARGET LEARNING SYSTEMS

CROSS-REFERENCE TO RELATED APPLICATIONS

This application claims priority to U.S. Provisional Application No. 63/742,162, titled "ARTIFICIAL INTELLI-GENCE (AI) BASED QUEST LEARNING PLATFORM," filed on Jan. 6, 2025, which is hereby incorporated by reference in its entirety.

BACKGROUND

Gamification is the systematic modification of systems, services, organizations, and activities through the integration of game design elements and principles into non-game environments. The objective is to optimize user engagement, motivation, competition, and participation by deploying game mechanics such as point accrual, achievement badges, leaderboards, and reward systems. Within system architecture, gamification is frequently utilized to enhance user interaction, organizational efficiency, workflow optimization, educational outcomes, crowdsourcing effectiveness, knowledge retention, talent acquisition and assessment, usability, system utility, physical activity, personalized user experiences, and social facilitation in applications such as dating platforms, traffic violation management, voter mobilization, and public perception of alternative energy solutions. Meta-analyses of gamification research indicate that the majority of empirical studies report statistically significant positive effects on individual users, although outcomes are modulated by individual differences and contextual variables.

Gamification methodologies are engineered to leverage core human psychological drivers, including social connectivity, cognitive development, mastery, competitive behavior, achievement orientation, status acquisition, self-expression, altruistic tendencies, and the cognitive framing of activities as play or games. Initial gamification frameworks predominantly employed extrinsic reward mechanisms to reinforce target behaviors, such as the allocation of points, achievement badges, progression metrics, and virtual currencies. The public display of accomplishments, via leaderboards or similar comparative interfaces, is implemented to amplify competitive dynamics among users. An alternative paradigm within gamification involves the transformation of conventional tasks to emulate game-like experiences. This is achieved through the incorporation of meaningful decision-making, structured onboarding protocols (e.g., interactive tutorials), incremental challenge escalation, and narrative-driven engagement.

BRIEF DESCRIPTION OF THE DRAWINGS

Detailed descriptions of implementations of the present invention will be described and explained through the use of the accompanying drawings.

Figure 1A:
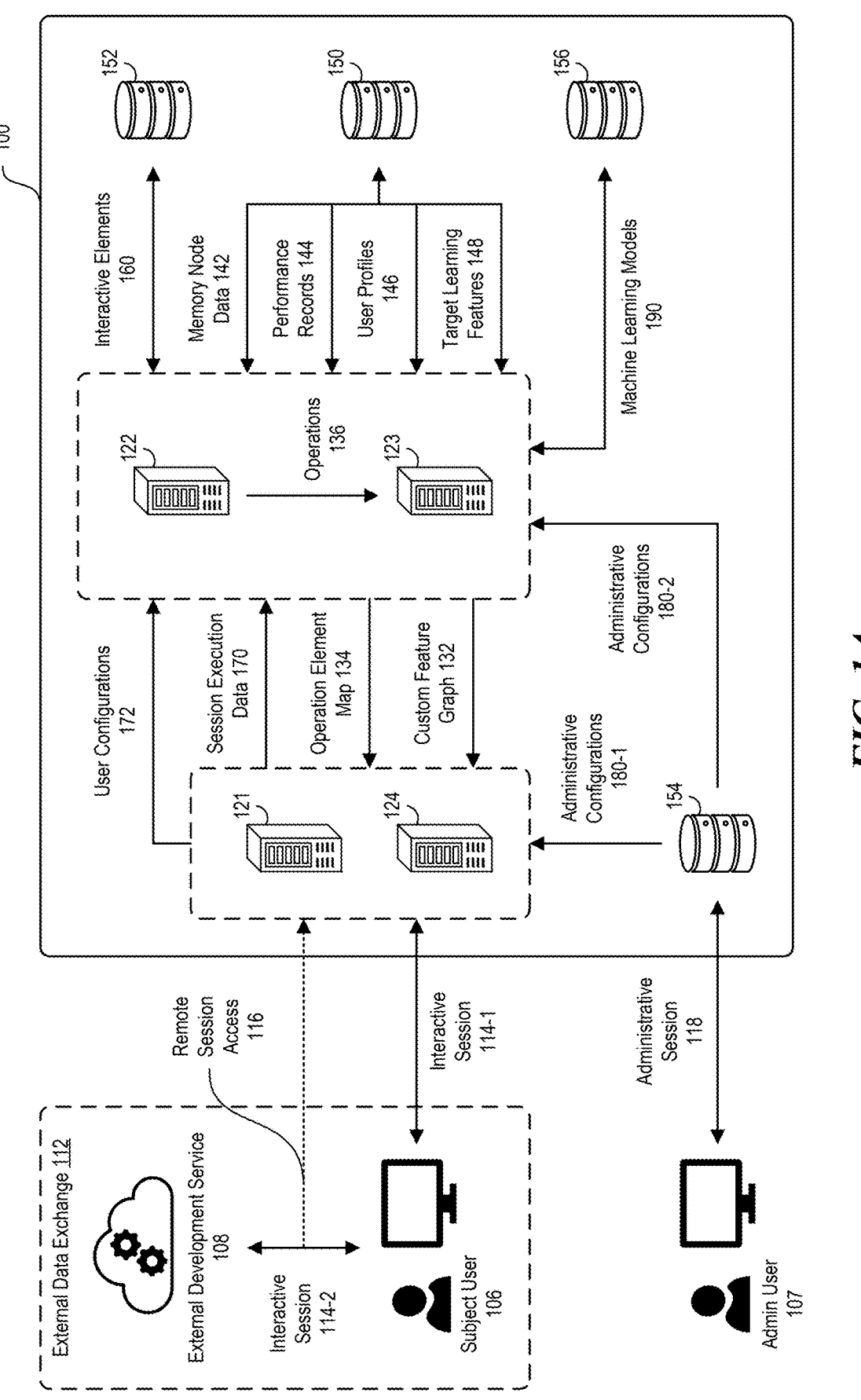
FIGS. 1A-1B are block diagrams that illustrate an adaptive learning system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional educational systems face significant challenges in delivering personalized learning experiences that adapt to individual student needs, learning styles, and career objectives. Conventional learning management systems (LMS) and educational platforms typically employ static, one-size-fits-all curricula that fail to account for the diverse learning capacities, motivational factors, and professional aspirations of individual learners (e.g., first-generation college students, underrepresented populations, career changers). These systems often present linear learning pathways with predetermined sequences of content that cannot dynamically adjust based on student performance, engagement levels, or evolving interests. The rigid structure of traditional educational frameworks creates barriers to effective skill acquisition and career development, particularly for students who require customized learning approaches to overcome socioeconomic obstacles and achieve economic mobility.

Furthermore, existing educational platforms lack the capability to provide real-time assessment of learning progress and intelligent pathway modification based on individual performance metrics. Current systems typically rely on manual content creation and static skill trees that require extensive human intervention to update or expand (e.g., manually inputting new quests, tasks, or learning modules). These platforms cannot automatically generate personalized learning objectives, validate student progress through intelligent analysis, or create dynamic branching pathways that respond to changing student needs. The absence of artificial intelligence (AI) integration in educational systems results in inefficient resource allocation, limited scalability, and inability to serve large populations of under resourced students who would otherwise benefit from adaptive, personalized learning experiences. Additionally, conventional educational platforms fail to incorporate gamification principles effectively, missing opportunities to enhance student engagement and motivation through interactive, quest-based learning experiences that provide immediate feedback and achievement recognition.

The disclosed system can generate interactive graphical interfaces that display graph structures comprising sequences of nodes, where each node stores interactive elements designed to validate specific target learning features for individual users. In some implementations, the sequences of nodes are acyclic sequences. An acyclic sequence is a succession of elements, such as data points or actions, that has a definitive beginning and end and contains no loops or repeating cycles. In essence, an acyclic sequence ensures a linear progression via a pathway, where the flow moves in one direction from one element to the next, representing a specific order of events or a linear ordering of vertices. In some acyclic sequences, it is impossible to start at an element and follow a path that leads back to that same element, thereby establishing a unidirectional dependency between elements. For instance, if task A must be completed before task B, it is impossible for task B to be a prerequisite for task A. Acyclic sequences also allow for a topological sort, which is a linear ordering of all vertices where every directed edge points from an earlier vertex to a later one. To that end, in some implementations, the nodes are memory nodes that store pointers to sets of other nodes in a particular sequence. A particular set of nodes can include none, one, or more than one nodes.

The system can receive execution signals indicating user completion of recommended operations associated with memory nodes, capturing performance measures that quantify learning achievement and skill acquisition. For example, the system can analyze user interaction data, completion rates, assessment scores, and engagement metrics to determine whether tolerance thresholds for learning validation have been satisfied. Tolerance thresholds can include ranges (e.g., 7-10 out of 10 items completed), percentages (e.g., 70%-100% of questions answered correctly), cut-offs (e.g., at least 7/10 items answered correctly), heatmaps (e.g., at least 80% of learners completing a specific module with a score above 85%), engagement metrics (e.g., average session duration of 20 minutes or more, or 5 interactions per session), and so forth. Additional examples of tolerance thresholds might include time-based metrics (e.g., completing a course within 6 weeks), social learning metrics (e.g., participating in 3 peer discussions as determined by the number of threads and/or number of posts), or competency-based metrics (e.g., demonstrating mastery of 5 specific skills).

The system can access stored historical records containing prior performance measures from previous learning activities and input both current and historical performance data into generative machine learning models to automatically generate new target learning features and corresponding recommended operations. Further, the system can selectively determine appropriate interactive elements that facilitate validation of newly generated learning objectives and automatically adjust graph structures to display additional memory nodes within acyclic sequences. The interactive elements can include user interfaces, graphics, menu items, and/or executables that enable user completion of learning tasks within specified interaction modalities. Interactive elements can take various suitable forms and can include various items, such as quizzes and assessments that provide feedback on correct or incorrect answers, drag-and-drop activities that challenge learners to arrange objects in a specific order, code editors, simulations, and the like.

The disclosed system can implement dynamic pathway generation capabilities that create personalized learning experiences based on individual user characteristics and performance history. For example, the system can receive seed datasets containing descriptive attributes indicating latent learning capacities and terminal learning objectives, then generate ordered sequences of target learning features that incrementally progress from foundational skills to advanced career-specific competencies. The system can create core memory nodes storing predefined interactive elements for baseline learning activities and generate intermediary memory nodes for specialized skill development. Further, the system can display sequential arrangements of graphical containers that organize interactive elements based on priority ratings and learning sequence optimization. The system can provide relational proximity-based navigation that allows users to focus on limited quantities of memory nodes within specific areas of the learning graph structure. For example, the system can generate branching acyclic sequences that originate from intermediary memory nodes, enabling multiple learning pathways and career exploration opportunities.

The disclosed system can integrate gamification elements and digital exchange platforms to enhance user engagement and motivation throughout the learning process. For example, the system can access user accounts storing allocable resources and automatically add predefined quantities of digital rewards when performance measures satisfy validation thresholds. The system can implement distance metrics that quantify gaps between current learning progress and terminal learning objectives, providing actionable insights for pathway optimization and goal attainment. Further, the system can generate multiple acyclic sequences of memory nodes that represent different competency tracks or career pathways, allowing users to explore diverse professional development opportunities simultaneously.

The technological framework described herein can be applied to various educational and professional development domains beyond traditional academic settings. For example, the system can be implemented in corporate training environments for employee skill development, professional certification programs, healthcare education for medical professionals, technical training for engineering disciplines, and military training applications. The system can be adapted for language learning platforms, financial literacy education, entrepreneurship development programs, and continuing education initiatives across multiple industries. Further, the system can be integrated with learning management systems (LMS), content repositories, educational databases, and assessment platforms to enhance functionality and expand resource accessibility for diverse user populations.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Adaptive Learning System

Figure 1B:
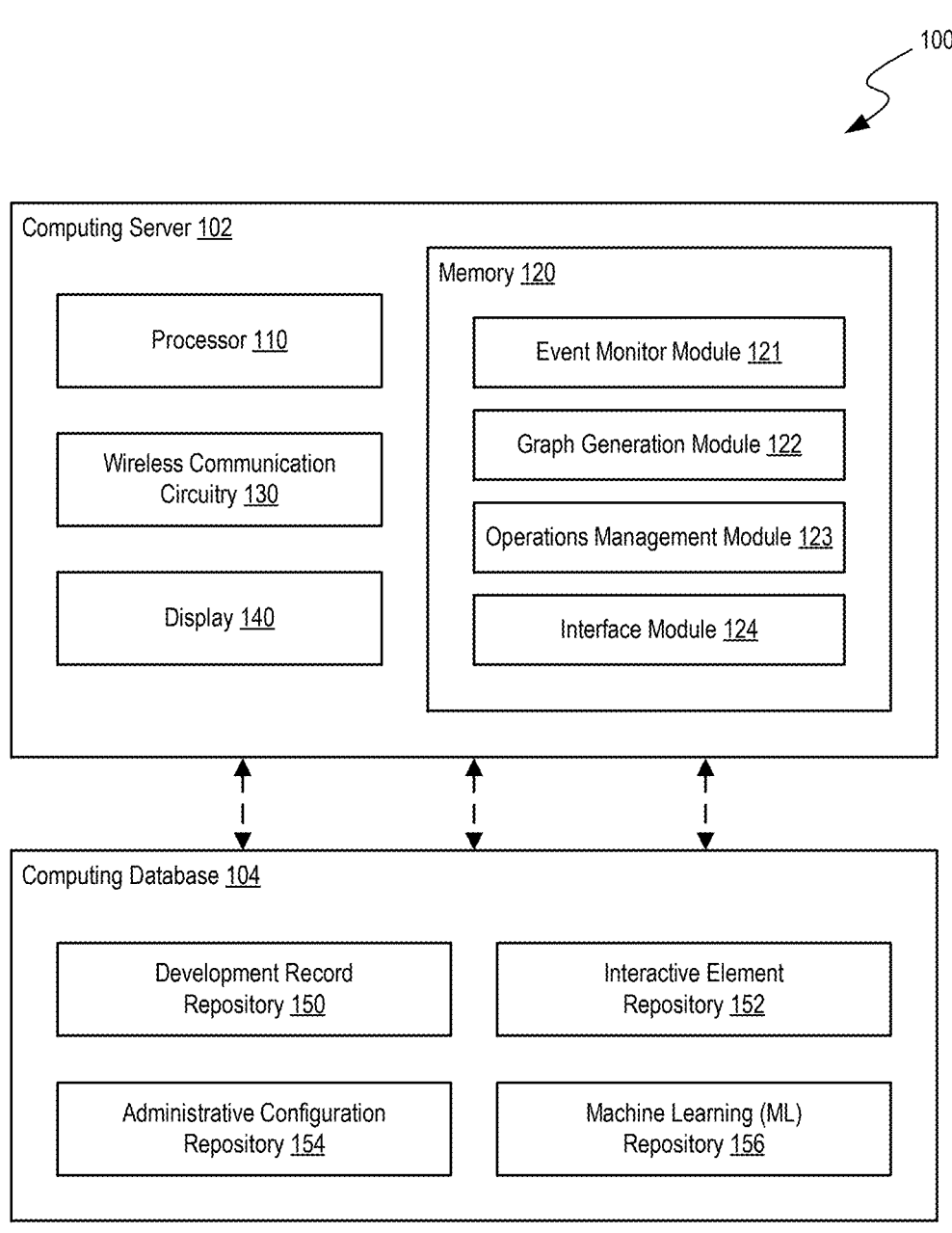

FIGS. 1A-1B are block diagrams that illustrate an adaptive learning system 100 ("system 100") that can implement aspects of the present technology. The components shown in FIGS. 1A-1B are merely illustrative, and well-known components are omitted for brevity. As shown in FIG. 1B, the computing server 102 includes a processor 110, a memory 120, a wireless communication circuitry 130 to establish wireless communication and/or information channels (e.g., Wi-Fi, internet, APIs, communication standards) with other computing devices and/or services (e.g., servers, databases, cloud infrastructure), and a display 140 (e.g., user interface). The processor 110 can have generic characteristics similar to general-purpose processors, or the processor 110 can be an application-specific integrated circuit (ASIC) that provides arithmetic and control functions to the computing server 102. While not shown, the processor 110 can include a dedicated cache memory. The processor 110 can be coupled to all components of the computing server 102, either directly or indirectly, for data communication. Further, the processor 110 of the computing server 102 can be communicatively coupled to a computing database 104 that is hosted alongside the computing server 102 on the core network 406 described in reference to FIG. 4. As shown, the computing database 104 can include a development record repository 150, an interactive element repository 152, an administrative configuration repository 154, and a machine learning (ML) repository 156.

The memory 120 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 110, the memory 120 can also store data generated by the processor 110 (e.g., when executing the modules of an optimization platform). In additional, or alternative, embodiments, the processor 110 can store temporary information onto the memory 120 and store long-term data onto the computing database 104. The memory 120 is merely an abstract representation of a storage environment. Hence, in some embodiments, the memory 120 comprises one or more actual memory chips or modules.

As shown in FIGS. 1A-1B, modules of the memory 120 can include an event monitor module 121, a graph generation module 122, an operations management module 123, and an interface module 124. Other implementations of the computing server 102 include additional, fewer, or different modules, or distribute functionality differently between the modules. As used herein, the term "module" and/or "engine" refers broadly to software components, firmware components, and/or hardware components. Accordingly, the modules 121-124 could each comprise software, firmware, and/or or hardware components implemented in, or accessible to, the computing server 102.

As shown in FIG. 1A, the adaptive learning system 100 includes an external data exchange 112 that facilitates communication and data transfer between various system components and external entities. In some implementations, the external data exchange 112 can serve as a centralized communication hub that manages data flow between internal system modules and external services, users, and third-party platforms. The external data exchange 112 can be implemented as a network interface layer that includes application programming interfaces (APIs), data transformation protocols, and secure communication channels to enable seamless integration with external systems such as Learning Management Systems (LMS) (e.g., Canvas, Moodle), content repositories (e.g., OpenStax, Khan Academy), educational databases (e.g., EBSCO, JSTOR), AI-powered educational tools (e.g., Knewton, DreamBox), cloud storage services (e.g., Google Drive, Dropbox), Identity and Access Management (IAM) systems (e.g., Okta, Azure AD), and/or the like. The external data exchange 112 can include data validation mechanisms that verify incoming data integrity, format conversion utilities that transform data between different schemas, and authentication protocols that ensure secure access to external resources. For example, when integrating with a Learning Management System, the external data exchange 112 can authenticate user credentials through OAuth protocols, retrieve course enrollment data through REST APIs, and synchronize learning progress through webhook notifications. As another example, when connecting to content repositories, the external data exchange 112 can query available educational resources through search APIs, download multimedia content through secure file transfer protocols, and cache frequently accessed materials in local storage systems. Additionally, the external data exchange 112 can facilitate real-time data synchronization with cloud storage services by implementing event-driven architectures that automatically update shared documents and learning materials across multiple platforms.

Within the external data exchange 112, an external development service 108 can provide specialized functionality for extending and customizing the adaptive learning system 100 capabilities. In some implementations, the external development service 108 can serve as a plugin architecture that allows third-party developers and educational organizations to create custom learning modules, assessment tools, and interactive content that integrates seamlessly with the core system functionality. The external development service 108 can be built upon a microservices architecture that includes containerized development environments (e.g., Docker containers), version control systems (e.g., Git repositories), continuous integration pipelines (e.g., Jenkins, GitHub Actions), and deployment orchestration tools (e.g., Kubernetes clusters) that enable scalable development and deployment of custom educational components. The external development service 108 can include software development kits (SDKs) that provide standardized interfaces for creating interactive elements, template libraries that offer pre-built learning activity frameworks, and testing environments that validate custom components before deployment. For example, an educational organization specializing in STEM education can utilize the external development service 108 to develop custom laboratory simulation modules that integrate with the adaptive learning system 100 through standardized APIs, allowing students to complete virtual experiments as part of their learning pathways. As another example, a content provider can use the external development service 108 to create adaptive assessment tools that dynamically adjust question difficulty based on student performance data, with the assessment results feeding back into the system's machine learning models for pathway optimization. Additionally, the external development service 108 can support collaborative development workflows where multiple organizations contribute to shared learning resource libraries, with version control and quality assurance mechanisms ensuring content consistency and educational effectiveness.

The adaptive learning system 100 includes a subject user 106 that represents individual learners who interact with the system to complete learning objectives and progress through personalized educational pathways. In some implementations, the subject user 106 can be characterized as an entity that engages with the interactive graphical interface to access learning content, complete recommended operations, and validate target learning features through various educational activities. The subject user 106 can be associated with user profile data that includes demographic information (e.g., age, educational background, geographic location), learning preferences (e.g., visual, auditory, kinesthetic learning styles), performance history (e.g., completion rates, assessment scores, time spent on activities), and career objectives (e.g., desired job roles, industry interests, skill development goals) that inform the system's personalized learning pathway generation. The subject user 106 can interact with the system through multiple interface modalities including web-based applications accessed through desktop computers, mobile applications running on smartphones and tablets, and hybrid interfaces that combine digital and physical learning materials. For example, a first-generation college student serving as a subject user 106 can access the adaptive learning system 100 through a mobile application to complete self-assessment activities during commute times, with the system tracking completion status and adjusting subsequent learning recommendations based on the student's demonstrated competencies and time constraints. As another example, an under-represented individual in the technology sector can utilize the system as a subject user 106 to progress through coding bootcamp preparation materials, with the system providing personalized programming exercises that adapt to the user's current skill level and learning pace while maintaining persistent progress tracking across multiple devices and sessions. Additionally, the subject user 106 can participate in collaborative learning activities where multiple users work together on group projects, with the system coordinating individual contributions and providing collective feedback that supports both individual skill development and team collaboration competencies.

In some implementations, the adaptive learning system 100 can include an admin user 107 that represents administrative personnel responsible for configuring system parameters, managing educational content, and overseeing learner progress across organizational contexts. The admin user 107 can be implemented as a privileged user role that includes access to administrative interfaces for defining authorized content sources, implementing specialized curricula, creating and organizing learning activities, and configuring AI-generated quest parameters using administrator-approved resources. The admin user 107 can utilize administrative configuration tools that include task list definition utilities for creating structured learning sequences, content source authorization controls for validating educational materials, curriculum implementation features for deploying organization-specific learning pathways, and analytics dashboards for monitoring learner engagement and performance metrics across user populations. The admin user 107 can be associated with organizational roles such as educational administrators, curriculum designers, learning and development managers, and instructional technologists who require comprehensive oversight capabilities for managing large-scale educational deployments. For example, a university administrator serving as an admin user 107 can configure the adaptive learning system 100 to support first-generation college students by defining specialized assessment criteria, authorizing access to institutional resources such as tutoring services and career counseling, and implementing tracking mechanisms that identify students who may benefit from additional support interventions. As another example, a corporate training manager functioning as an admin user 107 can customize the system to deliver professional development programs for under-represented employees by creating industry-specific learning pathways, integrating with company-specific tools and databases, and establishing mentorship connection protocols that trigger when significant pathway changes are requested. Additionally, the admin user 107 can manage multi-tenant configurations where different organizational units maintain separate learning environments while sharing common infrastructure resources, with role-based access controls ensuring appropriate data privacy and content segregation across different user populations.

The adaptive learning system 100 includes interactive session 114-1 and interactive session 114-2 that represent distinct user engagement instances where learners and administrators interact with the system to complete various educational and administrative tasks. In some implementations, the interactive session 114-1 and interactive session 114-2 can be implemented as stateful communication channels that maintain persistent connections between users and the system, enabling real-time data exchange, progress tracking, and dynamic content delivery throughout extended learning activities. The interactive sessions can be built upon a scalable technical architecture utilizing state hooks for state management to ensure persistent completion status of memory nodes, where state hooks function as reactive programming constructs that automatically synchronize user interface components with underlying data models and maintain consistency across multiple concurrent user interactions. The interactive sessions can include session management protocols that handle user authentication, maintain active connection monitoring, implement automatic session recovery mechanisms, and provide seamless handoff capabilities between different devices and platforms. The interactive sessions can support various interaction modalities including synchronous real-time activities (e.g., live virtual classrooms, collaborative problem-solving exercises), asynchronous self-paced learning (e.g., individual skill assessments, multimedia content consumption), and hybrid approaches that combine scheduled group activities with flexible individual work periods. For example, interactive session 114-1 can represent a subject user 106 engaging in a comprehensive career exploration pathway where the session maintains persistent state information about completed assessments, unlocked learning modules, and personalized recommendations, with state hooks ensuring that progress indicators update immediately when tasks are completed and remain consistent when the user switches between mobile and desktop interfaces. As another example, interactive session 114-2 can represent an admin user 107 conducting real-time curriculum configuration activities where the session maintains administrative context including current editing operations, pending approval workflows, and system configuration changes, with state management ensuring that administrative modifications are properly validated and synchronized across multiple concurrent administrative sessions. Additionally, the interactive sessions can implement advanced session analytics that track user engagement patterns, identify optimal learning times, and provide predictive insights about session completion likelihood, with this data feeding into machine learning models that optimize future session recommendations and resource allocation.

In some implementations, the adaptive learning system 100 can include remote session access 116 that functions as a distributed access framework for enabling multi-location connectivity to system resources across heterogeneous network environments. The remote session access 116 can be implemented as a cloud-based infrastructure that includes content delivery networks (CDNs) with edge caching mechanisms for optimized resource distribution (e.g., Amazon CloudFront, Akamai, Cloudflare, and/or the like), load balancing algorithms (e.g., round-robin, least connections, IP hash, and/or the like) for distributing concurrent user sessions across multiple server instances, and adaptive bitrate streaming protocols (e.g., HTTP Live Streaming, MPEG-DASH, WebRTC, and/or the like) that dynamically adjust content quality based on real-time bandwidth measurements and device capability detection. The remote session access 116 can incorporate security frameworks that implement multi-factor authentication mechanisms (e.g., time-based one-time passwords, biometric verification, hardware security keys, and/or the like), TLS/SSL encryption with perfect forward secrecy for data transmission, and JSON Web Token (JWT) management with configurable expiration policies to maintain session integrity across distributed system components. The remote session access 116 can support various connectivity scenarios including high-bandwidth fiber connections (e.g., 100+ Mbps) for synchronous video-based collaborative learning activities, optimized mobile data protocols with selective content compression (e.g., WebP image format, H.265 video encoding, and/or the like) for bandwidth-constrained environments, and progressive web application (PWA) architectures with IndexedDB storage that enable offline operation with conflict resolution algorithms for data synchronization when connectivity is restored. The remote session access 116 can integrate accessibility frameworks that implement Web Content Accessibility Guidelines (WCAG) 2.1 Level AA compliance, responsive design patterns with server-side adaptive rendering for different screen sizes and device capabilities, and compatibility layers for assistive technologies (e.g., screen readers, voice recognition software, alternative input devices, and/or the like). For example, the remote session access 116 can enable a subject user 106 to access learning materials through a bandwidth-optimized interface that automatically converts high-resolution images to WebP format with progressive loading, transcodes video content to lower bitrates with adaptive streaming capabilities, and implements a service worker cache hierarchy that prioritizes essential JavaScript modules and CSS resources for core functionality. As another example, the remote session access 116 can support an admin user 107 managing educational programs across multiple geographic regions by implementing a distributed database architecture with multi-region replication, conflict-free replicated data types (CRDTs) for concurrent administrative modifications, and event sourcing patterns that maintain a consistent audit trail of curriculum changes across all deployment environments. Additionally, the remote session access 116 can implement predictive resource prefetching algorithms that analyze user progression patterns through the acyclic sequence 212, calculate probability distributions for likely next nodes based on historical traversal data, and preemptively cache interactive elements 160 and associated media resources for pending memory nodes 222 to minimize perceived latency during learning pathway transitions.

In some implementations, the adaptive learning system 100 can include an event monitor module 121 that functions as a distributed telemetry system for capturing, processing, and analyzing interaction data across all system components and user sessions. The event monitor module 121 can be implemented as a microservices-based monitoring architecture that includes instrumentation components (e.g., browser-based event listeners, server-side middleware interceptors, database transaction hooks, and/or the like) that programmatically capture fine-grained interaction data including DOM events with timestamp precision, API request/response cycles with payload contents, database transaction metrics with execution times, and learning progression state transitions with contextual metadata. The event monitor module 121 can be constructed using event-driven architecture patterns that incorporate message broker systems (e.g., Apache Kafka with configurable topic partitioning, RabbitMQ with exchange-based routing, Amazon SQS with FIFO guarantees, and/or the like) for decoupling event producers from consumers, stream processing frameworks (e.g., Apache Storm with exactly-once processing semantics, Apache Flink with stateful computations, Spark Streaming with micro-batch processing, and/or the like) for real-time data transformation and aggregation, and time-series databases (e.g., InfluxDB with retention policies, Prometheus with dimensional data model, TimescaleDB with PostgreSQL compatibility, and/or the like) for efficient storage and querying of temporal event sequences. The event monitor module 121 can implement complex event processing algorithms that apply sliding window operations over event streams, calculate correlation coefficients between different interaction patterns, detect anomalous sequences using statistical deviation metrics, and generate real-time feature vectors for machine learning models 190. For example, the event monitor module 121 can track a subject user 106 progressing through a custom feature graph interface by instrumenting the interactive elements with interaction logging, capturing completion attempts with validation snapshots, recording tool usage patterns with selection positioning data, and correlating these behavioral metrics with performance scores to identify specific learning concepts where additional guidance or alternative explanation approaches may improve learning outcomes. As another example, the event monitor module 121 can monitor an admin user 107 configuring new learning pathways by capturing administrative interface 204 interaction sequences including navigation patterns, time measurements on different function container 260 elements, form field completion patterns with error rates, and configuration workflow efficiency metrics that can be analyzed to identify opportunities for interface optimization through reorganization of subfunction container 262 elements or implementation of predictive parameter selector 266 components. Additionally, the event monitor module 121 can implement anomaly detection algorithms using isolation forest techniques with configurable parameters, neural networks trained on normal interaction patterns, and time-series decomposition methods that separate regular patterns from irregular components to identify potential integrity violations (e.g., unusually rapid task completion, statistically improbable answer patterns, session anomalies) or technical issues (e.g., abnormal response time spikes, error rate increases, session termination patterns) requiring intervention.

The event monitor module 121 implements specialized data integration mechanisms that continuously synchronize user configurations 172 with session execution data 170 to create comprehensive behavioral profiles for adaptive learning optimization. These integration mechanisms utilize bidirectional data binding protocols that maintain real-time consistency between preference settings and interaction patterns, implementing change detection algorithms that identify configuration modifications and trigger corresponding adjustments in session monitoring parameters. The module employs configuration-driven instrumentation that dynamically adjusts telemetry granularity based on user privacy preferences, accessibility requirements, and performance optimization settings stored in user configurations 172. For processing session execution data 170, the event monitor module 121 implements temporal sequence analysis algorithms that construct session timelines with millisecond precision, identify session segmentation boundaries using activity clustering techniques, and calculate engagement metrics including active learning time, interaction frequency, and focus duration distributions. The module utilizes multi-dimensional session indexing structures that enable efficient querying across temporal, spatial, and behavioral dimensions, with specialized indexes for timestamp ranges, interface component interactions, and learning pathway traversal patterns. For personalization optimization, the event monitor module 121 implements correlation engines that identify relationships between configuration preferences and session performance metrics, with machine learning algorithms that detect patterns such as optimal content density settings for different cognitive load thresholds, color scheme preferences that correlate with extended engagement durations, and navigation method selections that improve completion efficiency for specific learning activities. These insights enable the system to automatically adjust interface rendering parameters, content presentation formats, and interaction modalities based on demonstrated performance patterns rather than relying solely on explicit user preferences.

The event monitor module 121 further implements advanced pattern recognition systems that analyze the acyclic sequence 212 traversal behaviors to identify optimal learning pathways. These systems utilize Markov chain models with state transition matrices that represent probabilistic movement between memory nodes, recurrent neural networks that process sequential node activation patterns to predict future navigation decisions, and reinforcement learning algorithms that identify high-reward pathways based on completion efficiency and knowledge retention metrics. The module incorporates adaptive sampling techniques that implement progressive data collection protocols, where interaction data granularity automatically increases when users encounter pending memory nodes 222 with historically high abandonment rates, decreases during routine navigation through validated memory node 220 sequences, and maintains baseline monitoring during scheduled memory node 224 preview activities. For cross-session analysis, the event monitor module 121 implements session stitching algorithms that reconstruct continuous learning journeys across multiple discrete login sessions, with identity resolution mechanisms that maintain consistent user tracking across different devices and access methods, and gap analysis techniques that identify potential learning discontinuities requiring intervention or additional support resources.

The event monitor module 121 implements specialized cognitive load estimation frameworks that analyze interaction patterns to dynamically adjust content presentation based on inferred mental workload. These frameworks utilize keystroke dynamics analysis that measures typing rhythm variations, pointer movement entropy calculations that quantify cursor path predictability, and dwell time distribution analysis that identifies potential comprehension challenges through statistical outlier detection. The module incorporates physiological proxy measures derived from interaction behaviors, including scroll velocity patterns that correlate with information processing rates, input correction frequency that indicates attention fluctuations, and task switching behaviors that signal potential cognitive overload conditions. For performance prediction, the event monitor module 121 implements early warning systems that utilize gradient boosting models trained on historical completion patterns to identify at-risk learning sequences, Bayesian knowledge tracing algorithms that maintain probabilistic mastery estimates across competency domains, and time-series forecasting models that predict completion timelines based on demonstrated learning velocities and remaining pathway complexity. These systems enable proactive intervention through automated scaffolding generation, where the system dynamically creates intermediate learning objectives when predicted completion probability falls below configurable thresholds, implements adaptive difficulty scaling when performance metrics indicate misalignment between user capability and challenge level, and generates supplemental resource recommendations targeted to specific knowledge gaps identified through error pattern analysis.

In some implementations, the user configurations 172 can function as a comprehensive data structure that stores multidimensional profile information about subject users, enabling personalized learning experiences and adaptive interface behaviors. The user configurations 172 can be implemented as a hierarchical JSON document structure with nested attribute objects that store preference settings with type validation constraints, demographic information with privacy classification tags, and behavioral metrics with statistical confidence intervals. This data structure can include learning style indicators that classify users according to VARK modality preferences (Visual, Auditory, Reading/Writing, Kinesthetic) with weighted distribution scores, cognitive load thresholds that define optimal information density parameters for different learning activities, and interface customization settings that specify color schemes, font characteristics, and layout preferences with device-specific overrides. For example, the user configurations 172 can store temporal availability patterns that indicate preferred learning times with day-of-week and time-of-day distributions, session duration preferences with minimum and maximum thresholds, and interruption tolerance metrics that inform notification frequency and urgency classifications for system-generated alerts and reminders.

The user configurations 172 can further implement specialized data structures for storing career trajectory information including current role specifications with responsibility domains and competency requirements, target role aspirations with skill gap analyses and timeline projections, and industry-specific certification paths with prerequisite relationship mappings. These structures can incorporate learning history repositories that maintain comprehensive records of completed pathways with performance metrics, abandoned learning sequences with termination reasons, and recurring struggle points with remediation attempt histories that inform future pathway recommendations and difficulty scaling decisions. The user configurations 172 can utilize secure encryption mechanisms for sensitive personal information with role-based access controls, implement data portability features that enable configuration export in standardized formats (e.g., JSON-LD with schema.org vocabulary mappings, SCORM-compliant learning records, xAPI statement collections), and maintain versioning systems that preserve configuration snapshots at significant milestone points for longitudinal analysis of preference evolution and learning progression patterns. For example, the user configurations 172 can store accessibility requirement specifications including screen reader compatibility flags, keyboard navigation preferences, and motor control accommodation settings that propagate through component inheritance hierarchies to ensure consistent application across all interface elements while maintaining configuration state persistence across multiple sessions and devices.

For session execution data 170, the event monitor module 121 can implement comprehensive session analytics frameworks that capture, process, and analyze temporal interaction sequences throughout user engagement periods. These frameworks can utilize session boundary detection algorithms that identify logical start and end points based on activity patterns, idle time thresholds, and explicit termination events. The module can implement session contextualization engines that enrich raw interaction data with environmental metadata including device characteristics, network conditions, geographic location, and temporal context factors. For session data persistence, the module can utilize distributed storage architectures with sharding strategies based on user identifiers, implement compression algorithms that reduce storage requirements while maintaining analytical fidelity, and apply retention policies that balance historical analysis needs with privacy considerations and storage optimization. The event monitor module 121 can generate session fingerprints using cryptographic hashing of interaction patterns to identify potential session impersonation attempts, implement progressive session recovery mechanisms that restore interface state after unexpected terminations, and utilize predictive session planning that pre-allocates computational resources based on historical usage patterns and scheduled activities.

The session execution data 170 can be structured as a time-series database schema that stores granular interaction events with microsecond timestamp precision, user action classifications with semantic tagging, and contextual metadata including interface component identifiers and interaction modality indicators. The data structure can implement hierarchical organization with session-level containers that encapsulate individual learning episodes, activity-level records that group related interactions within specific memory nodes, and atomic event entries that capture individual user actions with associated performance metrics. The session execution data 170 can incorporate real-time streaming capabilities that enable immediate processing of interaction events through Apache Kafka message queues with configurable partitioning strategies, implement data validation pipelines that verify event integrity and completeness before storage, and utilize indexing mechanisms optimized for temporal range queries and user-specific data retrieval. The module can implement data aggregation functions that calculate session-level metrics including total engagement time, task completion rates, error frequencies, and navigation efficiency scores, with machine learning feature extraction algorithms that transform raw interaction sequences into structured feature vectors suitable for predictive modeling and personalization optimization within the adaptive learning system 100.

The event monitor module 121 can implement comprehensive configuration management systems for administrative configurations 180-1 and 180-2 that enable organizational customization of learning environments while maintaining system integrity and performance. These systems can utilize configuration validation frameworks that verify parameter values against allowed ranges, check for logical consistency across related settings, and prevent configurations that could negatively impact system stability or educational effectiveness. The module can implement role-based configuration access controls that restrict modification capabilities based on administrative responsibility domains, maintain configuration inheritance hierarchies that allow organization-wide defaults with department-level overrides, and implement configuration deployment pipelines with staging environments for testing changes before production release. For configuration versioning, the module can maintain historical snapshots with rollback capabilities, implement change comparison visualizations that highlight differences between configuration versions, and utilize audit logging systems that record all configuration modifications with administrator identification and justification notes. The event monitor module 121 can generate configuration impact analyses that predict effects of proposed changes on system performance and user experience, implement configuration templates that encapsulate best practices for common educational scenarios, and utilize configuration analytics that identify correlation patterns between administrative settings and learning outcome metrics. For example, the module can analyze how administrative configurations 180-1 for assessment validation thresholds impact completion rates and learning velocity across different user demographics, while configurations 180-2 for interface customization affect engagement duration and feature utilization patterns.

The event monitor module 121 can further implement a hierarchical data aggregation pipeline that processes raw event data through multiple transformation stages with configurable retention policies. This pipeline can utilize a Lambda architecture that combines batch processing for historical analysis with stream processing for real-time insights, enabling both comprehensive retrospective analysis and immediate response capabilities. The batch layer can implement distributed processing frameworks (e.g., Apache Hadoop with YARN resource management, Apache Spark with resilient distributed datasets, Google Cloud Dataflow with unified batch/streaming model, and/or the like) that execute ETL operations on historical data with fault-tolerant processing guarantees, while the speed layer can leverage low-latency processing engines (e.g., Apache Samza with stateful processing, KSQL with SQL-like stream processing, AWS Kinesis Analytics with windowing functions, and/or the like) that compute incremental updates on recent data with sub-second latency requirements. The serving layer can implement specialized data access patterns including materialized view maintenance with incremental update mechanisms, multi-dimensional OLAP cubes with pre-aggregated metrics, and query federation services that combine results from both batch and speed layers with consistent semantics. For memory node traversal analysis, the event monitor module 121 can implement graph-based analytics that construct directed acyclic graphs representing user progression paths, calculate centrality measures identifying critical junction nodes where users frequently encounter difficulties, detect community structures revealing common learning patterns across user cohorts, and generate path optimization recommendations based on Markov chain models trained on successful completion sequences.

The event monitor module 121 can incorporate adaptive sampling mechanisms that dynamically adjust data collection granularity based on system load, user activity patterns, and analytical requirements. These mechanisms can implement reservoir sampling algorithms with weighted probability distributions that maintain statistically representative data subsets while reducing storage and processing overhead, time-decay functions that prioritize recent events over historical data with configurable half-life parameters, and importance sampling techniques that oversample rare but significant events based on predefined criticality metrics. The module can utilize distributed tracing frameworks (e.g., Jaeger with OpenTracing compatibility, Zipkin with B3 propagation, AWS X-Ray with service maps, and/or the like) that propagate correlation identifiers across service boundaries, construct execution graphs representing request flows through system components, measure latency distributions at each processing stage, and identify performance bottlenecks through critical path analysis. For interactive element engagement analysis, the event monitor module 121 can implement heatmap generation algorithms that visualize interaction density across interface components, dwell time analysis that correlates focus duration with learning outcomes, interaction sequence mining that identifies common usage patterns preceding successful task completion, and A/B testing frameworks that systematically evaluate alternative interactive element designs with statistical significance measurements. The module can also implement privacy-preserving analytics techniques including differential privacy mechanisms that add calibrated noise to aggregate statistics, k-anonymity enforcement that prevents individual identification through generalization operations, homomorphic encryption schemes that enable computation on encrypted data without decryption, and federated learning approaches that train models across distributed data sources without centralizing sensitive information.

The event monitor module 121 can implement specialized cognitive load assessment algorithms that analyze interaction patterns to estimate mental effort expended during learning activities. These algorithms can utilize response time variability metrics that measure consistency in task execution speed, error rate progression analysis that tracks mistake patterns across sequential attempts, interface navigation entropy calculations that quantify exploration versus directed behavior, and physiological proxy measures derived from input device interaction characteristics (e.g., mouse movement jitter, keystroke dynamics, touch pressure variations). The module can incorporate contextual enrichment processors that augment raw event data with environmental metadata including device capability information with hardware acceleration support detection, network condition metrics with bandwidth and latency measurements, temporal context factors with time-of-day and day-of-week classification, and geographic location data with timezone and regional setting awareness. For learning pathway optimization, the event monitor module 121 can implement reinforcement learning frameworks that model the learning environment as a Markov Decision Process, define state representations based on current knowledge and skill levels, implement action spaces corresponding to available learning activities, design reward functions aligned with educational objectives, and train policies that maximize long-term learning outcomes through techniques such as Q-learning with experience replay, policy gradients with advantage estimation, and actor-critic methods with value function approximation. The module can also implement predictive analytics capabilities including early warning systems that identify at-risk learners through pattern recognition before performance degradation occurs, knowledge retention forecasting that models forgetting curves with spaced repetition optimization, learning rate prediction that estimates time-to-mastery based on initial performance indicators, and adaptive difficulty adjustment that maintains optimal challenge levels through dynamic parameter tuning based on real-time performance feedback.

In some implementations, the adaptive learning system 100 can include a graph generation module 122 that functions as a visualization and pathway construction engine configured to create, maintain, and dynamically update interactive graph structures representing personalized learning pathways for individual users. The graph generation module 122 can be implemented as a graph processing system that incorporates graph database technologies for storing node relationships and pathway structures with properties such as completion status, prerequisite dependencies, and temporal sequencing. The system can utilize graph algorithms libraries for computing pathway recommendations based on topological sorting, centrality measures, and community detection algorithms. The system can implement real-time rendering engines for generating interactive visual representations with zoom capabilities, node filtering, and path highlighting features. The graph generation module 122 can utilize graph theory implementations including directed acyclic graphs (DAGs) with topological ordering constraints for representing prerequisite relationships between learning objectives, weighted edge algorithms for calculating pathway difficulty metrics and estimated completion times, and graph traversal algorithms for determining learning sequences based on quantifiable user competency metrics and career objective parameters. The graph generation module 122 can implement graph modification functions that programmatically adjust pathway structures in response to performance data exceeding predefined thresholds, add new memory nodes when validation criteria for learning objectives are satisfied, and create alternative pathway branches when users demonstrate mastery scores above specified thresholds or encounter learning difficulties identified through error rate analysis requiring remediation pathways. For example, the graph generation module 122 can generate a leadership development pathway by creating an acyclic sequence 212 with a hierarchical structure beginning with foundational nodes at the core level 230 (e.g., nodes containing interactive elements 160 for self-assessment activities and basic skill-building exercises), progressing through intermediate nodes at the intermediary level 232 (e.g., nodes containing simulation-based team exercises and communication practice scenarios), and culminating in advanced nodes at the terminal level 236 (e.g., nodes containing complex case studies and leadership challenge simulations), with each memory node programmatically populated with interactive elements 160 selected based on compatibility scores with learning style parameters and preference indicators stored in the user's profile data. As another example, the graph generation module 122 can construct a technical skills pathway by generating multiple parallel quest lines with bifurcation points that enable pathway specialization, where each quest line contains sequentially arranged nodes representing progressive skill development stages, with dynamic pathway adjustments that programmatically unlock advanced nodes when competency assessment scores exceed defined thresholds and generate alternative route recommendations when error patterns in assessment data indicate conceptual misunderstandings. Additionally, the graph generation module 122 can implement collaborative pathway generation functions that create shared graph structures with synchronized node access controls, where multiple subject users 106 receive programmatically generated role-specific nodes within a common project framework, with the system generating interconnected dependency relationships between individual nodes to enforce sequential task completion while maintaining data synchronization across participant interfaces through event-driven state management protocols.

In some implementations, the operation element map 134 is a specialized data structure within the graph generation module 122 that maintains bidirectional relationships between interactive elements 160 and recommended operations 136 across the entire adaptive learning system 100. The operation element map 134 is implemented as a bipartite graph data structure that utilizes adjacency matrices with sparse optimization techniques for efficient storage of element-operation relationships, hash-based indexing structures with O(1) lookup complexity for real-time relationship queries, and versioning mechanisms that maintain historical mapping states for audit and rollback capabilities. The operation element map 134 includes mapping algorithms that programmatically associate interactive elements 160 with specific recommended operations 136 based on competency alignment scores, pedagogical effectiveness ratings derived from historical performance data, and compatibility metrics with different learning modalities identified in user profiles 146. These algorithms implement weighted matching techniques that optimize element-operation pairings to maximize learning effectiveness while minimizing cognitive load through intelligent distribution of complex operations across multiple interactive elements. The operation element map 134 incorporates dynamic reconfiguration capabilities that automatically adjust element-operation relationships in response to performance analytics, implementing reinforcement learning models that continuously refine mapping weights based on success rates and completion efficiency metrics collected from session execution data 170. For example, the operation element map 134 maintains comprehensive relationship mappings for a data science learning pathway where specific interactive elements 160 such as code editors with syntax highlighting are mapped to programming implementation operations, interactive visualization tools are mapped to data exploration operations, and collaborative discussion forums are mapped to peer review operations, with each mapping including metadata about estimated completion time, prerequisite knowledge requirements, and difficulty scaling parameters that enable adaptive adjustment based on individual user capabilities.

The operation element map 134 data structure further implements contextual awareness mechanisms that dynamically adjust element-operation mappings based on user context variables including device capabilities detected through user agent analysis, accessibility requirements extracted from user configurations 172, and environmental constraints such as bandwidth limitations identified through network condition monitoring. These mechanisms utilize decision tree algorithms that select optimal interactive elements 160 for specific recommended operations 136 based on the current execution context, with fallback pathways that ensure operation completion capability across diverse technical environments. The operation element map 134 incorporates synchronization protocols that maintain mapping consistency across distributed system components, implementing event-sourcing patterns that record all mapping modifications as immutable events, conflict resolution algorithms that reconcile concurrent mapping updates through deterministic merge operations, and propagation mechanisms that ensure all system components maintain consistent views of current element-operation relationships. For collaborative learning scenarios, the operation element map 134 implements role-based mapping variations that assign different interactive elements 160 to the same recommended operations 136 based on participant roles within team activities, enabling specialized interface experiences while maintaining operational alignment across all participants engaged in shared learning objectives.

The custom feature graph 132 is a personalized learning pathway data structure that dynamically generates and displays individualized node structures and connection patterns based on user-specific competency requirements and career objectives. The custom feature graph 132 is implemented as an adaptive graph data structure that utilizes machine learning models to analyze user profile data including learning preferences, performance history, and career goals, applies graph construction algorithms that create optimized pathway structures with personalized node sequences and branching patterns, and includes real-time modification capabilities that adjust graph topology based on ongoing performance feedback and changing user requirements. The custom feature graph 132 includes personalization algorithms that customize node content, difficulty progression, and learning activity types based on individual learning styles and accessibility needs, dynamic pathway optimization mechanisms that continuously refine learning sequences based on performance data and engagement patterns, and collaborative features that enable shared learning experiences while maintaining individualized progression tracking. The custom feature graph 132 implements intelligent content curation systems that select appropriate interactive elements for each memory node based on competency alignment, learning effectiveness metrics, and user engagement predictions derived from historical interaction data. For example, the custom feature graph 132 generates a personalized cybersecurity career pathway for a subject user with strong mathematical background but limited programming experience, creating a customized sequence that accelerates through foundational mathematics nodes while providing comprehensive programming skill development activities, specialized security protocol training modules, and hands-on penetration testing exercises tailored to the user's learning pace and career timeline requirements.

The custom feature graph 132 data structure implements specialized visualization techniques that dynamically render personalized learning pathways using scalable vector graphics (SVG) with hardware acceleration support for complex graph structures containing hundreds of interconnected memory nodes. These visualization techniques include force-directed graph layouts that automatically position nodes to minimize edge crossings and optimize spatial distribution, hierarchical tree layouts that emphasize progression structure from core level 230 through intermediary level 232 to terminal level 236, and radial layouts that organize nodes in concentric circles emanating from central starting points. The custom feature graph 132 incorporates interactive manipulation capabilities including gesture-based navigation that enables pinch-to-zoom functionality on touchscreen devices, drag-and-drop node repositioning that allows users to customize their view of the learning landscape, and context-sensitive tooltips that display detailed node information when users hover over or focus on specific memory nodes. For accessibility enhancement, the custom feature graph 132 implements keyboard navigation shortcuts that enable tab-based traversal through the graph structure, voice command recognition that allows hands-free interaction with learning activities, and high-contrast rendering modes that improve visibility for users with visual impairments. The custom feature graph 132 utilizes WebSockets for bidirectional communication between client interfaces and server components, enabling real-time synchronization of graph state across multiple devices and immediate reflection of changes made by administrative users to learning pathways and content. Additionally, the custom feature graph 132 implements predictive node generation that analyzes career objective parameters and competency development patterns to forecast optimal future learning pathways, with the system proactively generating preview representations of potential pathway branches that become available as users progress through current learning sequences.

In some implementations, the memory node data 142 can function as a comprehensive data repository within the graph generation module 122 that stores structured information about individual learning nodes including their current state, content specifications, and relationship mappings within the acyclic sequence 212. The memory node data 142 can be implemented as a distributed database schema that utilizes document-oriented storage systems (e.g., MongoDB with BSON document format, CouchDB with JSON document structures, Amazon DynamoDB with NoSQL key-value pairs, and/or the like) for flexible data modeling, graph database technologies (e.g., Neo4j with property graph models, Amazon Neptune with RDF triple stores, ArangoDB with multi-model capabilities, and/or the like) for relationship management, and time-series databases (e.g., InfluxDB with retention policies, TimescaleDB with PostgreSQL compatibility, Prometheus with dimensional data models, and/or the like) for temporal state tracking. The memory node data 142 can include node specification records that define interactive element configurations with type classifications, validation criteria with threshold parameters, and prerequisite dependency mappings with conditional logic rules that determine node accessibility based on completion status of related nodes. The memory node data 142 can implement versioning mechanisms that maintain historical snapshots of node configurations, enabling rollback capabilities when pathway modifications produce suboptimal learning outcomes, and audit trail functionality that tracks all modifications to node specifications with timestamp precision and administrator identification for compliance and quality assurance purposes. For example, the memory node data 142 can store comprehensive specifications for a machine learning fundamentals node that includes interactive elements 160 such as Jupyter notebook environments with pre-configured Python libraries, video lecture components with closed captioning and transcript search capabilities, and assessment frameworks with adaptive question generation based on demonstrated competency levels, with each specification including metadata about estimated completion duration, cognitive load requirements, and compatibility with different learning modalities extracted from user profiles 146.

The memory node data 142 data structure can further implement intelligent caching mechanisms that optimize data retrieval performance through predictive prefetching algorithms that analyze user progression patterns within the acyclic sequence 212 to anticipate likely next node access requests. These caching mechanisms can utilize distributed caching systems (e.g., Redis with cluster mode, Memcached with consistent hashing, Apache Ignite with in-memory computing, and/or the like) that maintain frequently accessed node specifications in high-speed memory storage, cache invalidation strategies that automatically refresh outdated node data when administrative users modify pathway configurations through the administrative interface 204, and data compression techniques that minimize storage requirements while preserving full fidelity of interactive element specifications and validation criteria. The memory node data 142 can incorporate synchronization protocols that maintain consistency across multiple distributed instances, implementing eventual consistency models with conflict resolution algorithms that prioritize recent administrative modifications while preserving user progress data, and replication strategies that ensure high availability through geographic distribution of node data across multiple data centers. For collaborative learning scenarios, the memory node data 142 can implement shared state management that enables multiple subject users 106 to interact with common node instances while maintaining individual progress tracking, with concurrency control mechanisms that prevent data corruption when multiple users simultaneously access shared interactive elements 160 and validation systems that ensure fair assessment when users complete collaborative recommended operations 136.

In some implementations, the performance records 144 can function as a comprehensive analytics repository within the graph generation module 122 that captures, processes, and stores quantitative and qualitative metrics associated with user interactions across all memory nodes within personalized learning pathways. The performance records 144 can be implemented as a multi-dimensional data warehouse architecture that utilizes columnar storage systems (e.g., Apache Parquet with compression algorithms, Amazon Redshift with massively parallel processing, Google BigQuery with serverless analytics, and/or the like) for efficient analytical query processing, stream processing frameworks (e.g., Apache Kafka with real-time data pipelines, Amazon Kinesis with scalable data streaming, Apache Pulsar with geo-replication, and/or the like) for continuous data ingestion, and machine learning feature stores (e.g., Feast with feature serving, Tecton with real-time feature computation, Amazon SageMaker Feature Store with online/offline access, and/or the like) that transform raw performance data into structured feature vectors for predictive modeling. The performance records 144 can include granular interaction metrics that capture completion timestamps with millisecond precision, accuracy scores with confidence intervals, attempt counts with error categorization, and engagement duration measurements with attention tracking indicators derived from user interface interaction patterns. The performance records 144 can implement statistical analysis algorithms that calculate performance trends over time, identify learning velocity patterns across different competency domains, and detect anomalous performance indicators that may suggest technical issues or academic integrity concerns requiring intervention. For example, the performance records 144 can maintain comprehensive analytics for a subject user 106 progressing through a data visualization pathway, capturing detailed metrics including code execution success rates with error type classifications, visualization quality assessments with peer review scores, time-to-completion measurements with cognitive load estimations, and knowledge retention indicators derived from spaced repetition assessments administered at strategic intervals throughout the learning sequence.

The performance records 144 data structure can further implement predictive analytics capabilities that utilize machine learning models 190 to forecast user performance trajectories and identify optimal intervention timing for learning support activities. These predictive capabilities can incorporate ensemble learning techniques (e.g., Random Forest with feature importance ranking, Gradient Boosting with adaptive learning rates, XGBoost with regularization parameters, and/or the like) that combine multiple performance indicators to generate comprehensive competency predictions, time-series forecasting models (e.g., ARIMA with seasonal decomposition, LSTM neural networks with attention mechanisms, Prophet with holiday effects, and/or the like) that project future learning outcomes based on historical performance patterns, and clustering algorithms (e.g., K-means with elbow method optimization, DBSCAN with density-based grouping, Gaussian Mixture Models with expectation maximization, and/or the like) that identify user cohorts with similar learning characteristics for personalized pathway recommendations. The performance records 144 can implement real-time alerting systems that monitor performance metrics against configurable thresholds, automatically generating notifications for administrative users when users demonstrate exceptional achievement warranting accelerated progression or concerning performance patterns requiring additional support resources. For longitudinal analysis, the performance records 144 can maintain historical performance trajectories that enable competency transfer analysis across different learning domains, with correlation engines that identify relationships between performance in foundational nodes and success rates in advanced terminal level 236 activities, enabling the graph generation module 122 to optimize pathway sequencing based on empirical evidence of learning effectiveness.

In some implementations, the user profiles 146 can function as comprehensive identity and preference management systems within the graph generation module 122 that store multidimensional user characteristics, learning preferences, and contextual information that inform personalized pathway generation and content curation decisions. The user profiles 146 can be implemented as secure profile management systems that utilize encrypted storage mechanisms (e.g., AES-256 encryption with key rotation, RSA public-key cryptography with digital signatures, elliptic curve cryptography with forward secrecy, and/or the like) for protecting sensitive personal information, role-based access control systems (e.g., OAuth 2.0 with scope-based permissions, SAML with federated identity management, OpenID Connect with identity verification, and/or the like) that ensure appropriate data access based on user authorization levels, and privacy-preserving analytics techniques (e.g., differential privacy with calibrated noise injection, k-anonymity with generalization algorithms, homomorphic encryption with computation on encrypted data, and/or the like) that enable aggregate analysis while protecting individual privacy. The user profiles 146 can include demographic information with privacy classification tags, learning style assessments with VARK modality distributions, accessibility requirements with assistive technology specifications, and career objective parameters with industry-specific competency mappings that guide the selection and sequencing of target learning features 148. The user profiles 146 can implement dynamic profiling algorithms that continuously update user characteristics based on observed interaction patterns, performance trends, and explicit preference modifications, with machine learning models that infer latent preferences from behavioral data and adaptive recommendation systems that suggest profile enhancements based on successful learning outcomes achieved by users with similar characteristics. For example, the user profiles 146 can maintain comprehensive profiles for subject users 106 pursuing leadership development pathways, storing detailed information including communication style preferences derived from assessment results, team collaboration effectiveness metrics calculated from peer evaluation data, conflict resolution approach indicators extracted from simulation performance, and leadership philosophy alignments with organizational culture parameters that inform the customization of learning activities and assessment criteria.

The user profiles 146 data structure can further implement intelligent personalization engines that analyze profile data to generate customized learning experiences through adaptive content delivery, interface customization, and pathway optimization algorithms. These personalization engines can utilize collaborative filtering techniques (e.g., matrix factorization with singular value decomposition, neighborhood-based methods with similarity metrics, deep learning approaches with neural collaborative filtering, and/or the like) that identify users with similar learning patterns and preferences to generate personalized recommendations, content-based filtering algorithms (e.g., TF-IDF with cosine similarity, word embeddings with semantic matching, topic modeling with latent Dirichlet allocation, and/or the like) that match user interests with available learning content, and hybrid recommendation systems that combine multiple filtering approaches to optimize recommendation accuracy and diversity. The user profiles 146 can implement contextual adaptation mechanisms that adjust learning experiences based on temporal factors including time-of-day preferences, day-of-week availability patterns, and seasonal learning intensity variations, with environmental context awareness that considers device capabilities, network conditions, and location-based constraints when delivering personalized content. For social learning integration, the user profiles 146 can maintain social network graphs that identify learning partnerships, mentorship relationships, and peer collaboration preferences, enabling the graph generation module 122 to generate collaborative pathway segments that leverage social connections to enhance learning engagement and knowledge retention through peer-to-peer learning activities and group-based challenges.

In some implementations, the target learning features 148 can function as structured competency definition systems within the graph generation module 122 that specify measurable learning objectives, assessment criteria, and skill development outcomes that guide the creation and validation of memory nodes within personalized learning pathways. The target learning features 148 can be implemented as ontology-based knowledge representation systems that utilize semantic web technologies (e.g., RDF with triple store databases, OWL with description logic reasoning, SPARQL with federated query processing, and/or the like) for standardized competency modeling, taxonomic classification frameworks (e.g., Bloom's Taxonomy with cognitive domain hierarchies, SOLO Taxonomy with structural complexity levels, Webb's Depth of Knowledge with cognitive rigor matrices, and/or the like) for systematic skill categorization, and competency mapping algorithms that establish prerequisite relationships and learning progression sequences based on pedagogical research and empirical performance data. The target learning features 148 can include detailed competency specifications with measurable outcome criteria, assessment methodology definitions with validation protocols, and skill transfer indicators that quantify the applicability of validated competencies to related learning domains and career objectives. The target learning features 148 can implement adaptive difficulty scaling mechanisms that adjust competency requirements based on user performance history stored in performance records 144, with machine learning algorithms that optimize challenge levels to maintain engagement while preventing cognitive overload through intelligent workload distribution across multiple learning activities. For example, the target learning features 148 can define comprehensive competency objectives for a software engineering pathway including programming proficiency targets with language-specific skill requirements, software design competencies with architectural pattern knowledge, testing methodology mastery with automated validation capabilities, and collaborative development skills with version control and code review proficiencies, with each target feature including detailed rubrics that specify assessment criteria and performance thresholds for competency validation.

The target learning features 148 data structure can further implement intelligent competency sequencing algorithms that analyze prerequisite relationships and learning dependencies to generate optimal progression pathways through the acyclic sequence 212 of memory nodes. These sequencing algorithms can utilize topological sorting techniques (e.g., Kahn's algorithm with dependency resolution, depth-first search with cycle detection, parallel processing with concurrent execution, and/or the like) that ensure logical prerequisite ordering while maximizing learning efficiency, constraint satisfaction algorithms (e.g., backtracking with pruning strategies, local search with neighborhood exploration, genetic algorithms with evolutionary optimization, and/or the like) that balance multiple competing objectives including time constraints, difficulty progression, and learning style preferences, and reinforcement learning approaches (e.g., Q-learning with experience replay, policy gradient methods with advantage estimation, actor-critic algorithms with value function approximation, and/or the like) that optimize competency sequencing based on empirical learning outcomes and user engagement metrics. The target learning features 148 can implement competency transfer analysis systems that evaluate the applicability of validated skills to alternative career pathways and learning objectives, with similarity matching algorithms that identify related competencies across different domains and recommendation engines that suggest complementary skill development opportunities based on industry demand patterns and professional advancement trajectories. For adaptive pathway generation, the target learning features 148 can maintain dynamic competency models that evolve based on industry trends, technological developments, and changing skill requirements, with automated content curation systems that identify emerging competency areas and generate new target learning features that align with evolving professional standards and market demands.

The graph generation module 122 can further implement adaptive visualization techniques that dynamically adjust the visual representation of the graph structure based on user interaction patterns and device capabilities. These techniques can include force-directed layout algorithms that automatically position nodes to minimize edge crossings and optimize spatial distribution, progressive rendering mechanisms that load graph components in priority order based on viewport visibility and interaction probability, and responsive scaling functions that adjust node density and connection visibility based on zoom level and display resolution. The module can incorporate semantic zooming capabilities that transform the information density and representation type at different magnification levels, displaying summary statistics and aggregated completion metrics at zoomed-out views while revealing detailed node properties and interactive elements at zoomed-in perspectives. For memory node generation, the graph generation module 122 can implement template-based node construction algorithms that programmatically assemble memory nodes from modular components based on learning objective classifications, difficulty parameters, and estimated completion time requirements. These algorithms can utilize parameterized node templates with configurable slots for interactive elements, validation criteria, and prerequisite relationships, enabling efficient generation of diverse node types while maintaining structural consistency across the learning pathway. The module can implement node population strategies that leverage machine learning models to select optimal combinations of interactive elements for each memory node based on predicted engagement levels, learning effectiveness metrics, and alignment with the target learning feature's competency requirements.

The graph generation module 122 can implement advanced pathway optimization algorithms that continuously refine learning pathways based on aggregated performance data and emerging patterns. These algorithms can utilize A* search techniques with heuristic functions calibrated to balance learning efficiency with comprehensive skill development, genetic algorithms that evolve pathway structures through mutation and crossover operations applied to high-performing pathway segments, and reinforcement learning approaches that optimize node sequencing based on reward signals derived from completion rates and performance metrics. The module can incorporate constraint satisfaction algorithms that generate pathways meeting multiple competing objectives including time constraints, prerequisite dependencies, and learning style preferences, while maintaining pedagogical integrity through domain-specific rules encoded as constraint parameters. For multi-user environments, the graph generation module 122 can implement cohort-based pathway generation that creates parallel graph structures with synchronized progression points for groups of learners, enabling collaborative challenges at specific junction nodes while maintaining individualized learning paths between synchronization points. These structures can incorporate branching reconciliation mechanisms that merge divergent learning paths at designated convergence nodes, allowing learners to temporarily pursue specialized interests before rejoining the main progression sequence. The module can implement differential access control mechanisms that selectively reveal portions of the complete graph structure based on user role permissions, team assignments, and progress status, creating tailored views of the learning landscape while maintaining a consistent underlying graph database.

The graph generation module 122 can implement specialized graph transformation operations that support complex learning scenarios and organizational requirements. These operations can include graph merging algorithms that combine separately developed pathway segments into coherent integrated structures, with conflict resolution mechanisms for handling overlapping nodes and competing prerequisite relationships. The module can utilize graph partitioning techniques that decompose comprehensive learning pathways into manageable sub-graphs for targeted skill development, with interface mechanisms that maintain visual continuity across partition boundaries through preview nodes and connection indicators. For enterprise deployment scenarios, the graph generation module 122 can implement role-based graph templating that generates specialized pathway variations from common structural foundations, with parameterized node content and branching patterns tailored to specific job functions, career levels, and departmental requirements. These templates can incorporate conditional node activation rules that dynamically adjust pathway availability based on organizational context variables such as department assignments, project allocations, and certification requirements. The module can implement temporal graph scheduling algorithms that distribute learning activities across configurable timeframes, with workload balancing mechanisms that prevent cognitive overload by limiting concurrent active nodes and spacing high-intensity learning activities. These scheduling algorithms can incorporate spaced repetition principles through strategically positioned reinforcement nodes that reactivate previously validated concepts at optimal intervals for long-term retention, with difficulty scaling based on demonstrated mastery levels and time elapsed since initial validation.

In some implementations, the adaptive learning system 100 can include an operations management module 123 that functions as a distributed processing framework for executing computational workflows associated with learning activities, validating performance metrics, and synchronizing data across system components. The operations management module 123 can be implemented as a microservices-based architecture that includes workflow orchestration engines (e.g., Apache Airflow with directed acyclic graph (DAG) definitions, Kubernetes Jobs with configurable parallelism settings, AWS Step Functions with state machine definitions, and/or the like) for programmatically defining and executing multi-stage learning sequences, task scheduling systems (e.g., Quartz Scheduler with cron-based triggers, Celery with message broker integration, Apache Oozie with XML workflow specifications, and/or the like) for automating time-dependent operations with configurable execution parameters, and resource allocation algorithms (e.g., bin-packing algorithms, priority-based scheduling, round-robin distribution) that distribute computational workloads across available processing nodes based on current utilization metrics and priority coefficients. The operations management module 123 can implement distributed state management protocols that utilize atomic transactions for updating completion status flags of individual recommended operations 136, maintain eventual consistency through conflict resolution algorithms when concurrent modifications occur, and implement event-sourcing patterns that maintain an immutable log of all state transitions for audit and recovery purposes. The operations management module 123 can include validation engines that execute rule-based assessment algorithms against user-generated artifacts, implement adaptive difficulty scaling through Bayesian knowledge tracing models that estimate user competency levels with confidence intervals, and generate multidimensional performance vectors that serve as feature inputs for machine learning models 190. For example, the operations management module 123 can coordinate a custom feature graph interface with multiple quest lines emanating from a central node, where the system programmatically tracks completion status across multiple recommended operations 136 including coding exercises with automated test suite validation, knowledge assessment quizzes with parameterized question generation, virtual lab environments with instrumented performance monitoring, and peer review activities with rubric-based evaluation metrics, with each operation generating structured performance data that is aggregated into composite competency scores through weighted averaging algorithms. As another example, the operations management module 123 can manage a distributed project-based learning workflow where the system implements role-based access control for shared resources, executes dependency resolution algorithms that determine task sequencing based on prerequisite relationships, applies conflict detection mechanisms when multiple users attempt to modify shared artifacts simultaneously, and implements versioning systems that maintain separate branches for individual contributions before executing merge operations with conflict resolution rules. Additionally, the operations management module 123 can implement resource optimization algorithms that execute predictive scaling operations based on historical usage patterns analyzed through time-series forecasting models, implement priority queuing systems that allocate computational resources according to configurable business rules, and execute content prefetching operations that utilize predictive models to identify and cache high-probability next nodes based on current user position within the acyclic sequence 212 and historical traversal patterns of similar user cohorts.

The operations management module 123 implements specialized data integration mechanisms that continuously synchronize user configurations 172 with session execution data 170 to create comprehensive behavioral profiles for adaptive learning optimization. These integration mechanisms utilize bidirectional data binding protocols that maintain real-time consistency between preference settings and interaction patterns, implementing change detection algorithms that identify configuration modifications and trigger corresponding adjustments in session monitoring parameters. The module employs configuration-driven instrumentation that dynamically adjusts telemetry granularity based on user privacy preferences, accessibility requirements, and performance optimization settings stored in user configurations 172. For processing session execution data 170, the operations management module 123 implements temporal sequence analysis algorithms that construct session timelines with millisecond precision, identify session segmentation boundaries using activity clustering techniques, and calculate engagement metrics including active learning time, interaction frequency, and focus duration distributions. The module utilizes multi-dimensional session indexing structures that enable efficient querying across temporal, spatial, and behavioral dimensions, with specialized indexes for timestamp ranges, interface component interactions, and learning pathway traversal patterns. For personalization optimization, the operations management module 123 implements correlation engines that identify relationships between configuration preferences and session performance metrics, with machine learning algorithms that detect patterns such as optimal content density settings for different cognitive load thresholds, color scheme preferences that correlate with extended engagement durations, and navigation method selections that improve completion efficiency for specific learning activities. These insights enable the system to automatically adjust interface rendering parameters, content presentation formats, and interaction modalities based on demonstrated performance patterns rather than relying solely on explicit user preferences.

The operations management module 123 further implements advanced pattern recognition systems that analyze the acyclic sequence 212 traversal behaviors to identify optimal learning pathways. These systems utilize Markov chain models with state transition matrices that represent probabilistic movement between memory nodes, recurrent neural networks that process sequential node activation patterns to predict future navigation decisions, and reinforcement learning algorithms that identify high-reward pathways based on completion efficiency and knowledge retention metrics. The module incorporates adaptive sampling techniques that implement progressive data collection protocols, where interaction data granularity automatically increases when users encounter pending memory nodes 222 with historically high abandonment rates, decreases during routine navigation through validated memory node 220 sequences, and maintains baseline monitoring during scheduled memory node 224 preview activities. For cross-session analysis, the operations management module 123 implements session stitching algorithms that reconstruct continuous learning journeys across multiple discrete login sessions, with identity resolution mechanisms that maintain consistent user tracking across different devices and access methods, and gap analysis techniques that identify potential learning discontinuities requiring intervention or additional support resources.

The operations management module 123 implements specialized cognitive load estimation frameworks that analyze interaction patterns to dynamically adjust content presentation based on inferred mental workload. These frameworks utilize keystroke dynamics analysis that measures typing rhythm variations, pointer movement entropy calculations that quantify cursor path predictability, and dwell time distribution analysis that identifies potential comprehension challenges through statistical outlier detection. The module incorporates physiological proxy measures derived from interaction behaviors, including scroll velocity patterns that correlate with information processing rates, input correction frequency that indicates attention fluctuations, and task switching behaviors that signal potential cognitive overload conditions. For performance prediction, the operations management module 123 implements early warning systems that utilize gradient boosting models trained on historical completion patterns to identify at-risk learning sequences, Bayesian knowledge tracing algorithms that maintain probabilistic mastery estimates across competency domains, and time-series forecasting models that predict completion timelines based on demonstrated learning velocities and remaining pathway complexity. These systems enable proactive intervention through automated scaffolding generation, where the system dynamically creates intermediate learning objectives when predicted completion probability falls below configurable thresholds, implements adaptive difficulty scaling when performance metrics indicate misalignment between user capability and challenge level, and generates supplemental resource recommendations targeted to specific knowledge gaps identified through error pattern analysis.

The operations management module 123 implements comprehensive recommended operations 136 generation algorithms that synthesize data from user configurations 172, session execution data 170, and interactive elements 160 to create personalized learning activities within the custom feature graph 132. These algorithms utilize multi-criteria decision analysis frameworks that evaluate potential operations based on competency alignment scores derived from target learning features 148, user engagement predictions calculated from historical interaction patterns, and resource availability constraints extracted from system capacity monitoring. The module employs template-based operation construction that selects appropriate interactive elements 160 from the interactive element repository 152 based on compatibility matrices that consider user accessibility requirements, device capabilities, and learning modality preferences stored in user configurations 172. For dynamic operation adaptation, the operations management module 123 implements real-time difficulty adjustment mechanisms that analyze session execution data 170 to identify performance trends and automatically modify operation parameters such as time limits, complexity levels, and scaffolding availability. The module incorporates intelligent sequencing algorithms that determine optimal ordering of recommended operations 136 within memory nodes based on cognitive load distribution models, prerequisite dependency graphs, and spaced repetition scheduling that maximizes retention while minimizing mental fatigue. For example, the operations management module 123 can generate a programming competency validation sequence that begins with code reading comprehension tasks using interactive elements 160 configured for syntax highlighting and annotation tools, progresses through guided coding exercises with real-time error detection and hint systems, and culminates in independent project development activities with automated testing frameworks and peer review components, with each operation's difficulty and support level dynamically adjusted based on user performance patterns extracted from session execution data 170 and preference settings stored in user configurations 172.

The operations management module 123 implements sophisticated operation element map 134 generation processes that establish bidirectional relationships between interactive elements 160 and recommended operations 136 across the entire adaptive learning system 100. These processes utilize graph-based mapping algorithms that analyze element capabilities, operation requirements, and user context variables to create optimal element-operation pairings through weighted bipartite matching techniques. The module employs semantic analysis engines that process interactive element metadata such as supported interaction modalities, content types, assessment capabilities, and accessibility features to determine compatibility scores with specific recommended operations 136. For dynamic mapping optimization, the operations management module 123 implements reinforcement learning models that continuously refine element-operation associations based on success rates, completion times, and user satisfaction metrics collected from session execution data 170. The module incorporates contextual mapping strategies that adjust element selections based on user configurations 172 including device capabilities, network conditions, accessibility requirements, and learning preferences, ensuring optimal user experience across diverse technical environments. For collaborative learning scenarios, the operations management module 123 implements multi-user mapping coordination that assigns complementary interactive elements 160 to team members based on role specifications and competency distributions, with synchronization mechanisms that maintain consistent operation execution across distributed participants. The operation element map 134 generation process includes validation algorithms that verify element-operation compatibility through automated testing procedures, performance benchmarking that measures execution efficiency across different element combinations, and fallback mapping strategies that provide alternative element selections when primary mappings become unavailable due to technical constraints or resource limitations. Additionally, the operations management module 123 implements map versioning systems that maintain historical snapshots of element-operation relationships, enabling rollback capabilities when mapping modifications produce suboptimal learning outcomes and audit trail functionality that tracks all mapping changes for compliance and quality assurance purposes.

The operations management module 123 implements sophisticated machine learning models 190 that function as generative engines for creating personalized recommended operations 136 based on comprehensive analysis of user configurations 172, session execution data 170, and interactive elements 160. These generative models utilize transformer-based architectures with attention mechanisms that process multi-modal input data including user preference vectors extracted from user configurations 172, temporal behavioral sequences derived from session execution data 170, and capability matrices representing available interactive elements 160 from the interactive element repository 152. The machine learning models 190 employ variational autoencoders with latent space representations that encode user learning patterns, competency progression trajectories, and engagement preferences into compressed feature vectors that serve as conditioning inputs for operation generation algorithms. The generative process utilizes conditional generation techniques where the models receive contextual prompts containing target learning features 148 specifications, current competency assessments, and available resource constraints to produce structured operation definitions with appropriate difficulty scaling, interaction modalities, and validation criteria. For example, when generating recommended operations 136 for a data analysis competency node within the custom feature graph 132, the machine learning models 190 analyze user configurations 172 indicating preference for visual learning modalities, process session execution data 170 showing strong performance in statistical concepts but struggles with programming syntax, and evaluate available interactive elements 160 including data visualization tools and coding environments to generate a sequence of operations that emphasizes graphical data exploration tasks with scaffolded programming exercises that provide syntax assistance and incremental complexity progression.

The operations management module 123 utilizes reinforcement learning models within the machine learning models 190 framework to optimize recommended operations 136 generation through continuous feedback loops that analyze completion success rates, engagement metrics, and learning outcome effectiveness. These reinforcement learning agents implement actor-critic architectures where the actor network generates candidate operation sequences based on current user state representations derived from user configurations 172 and session execution data 170, while the critic network evaluates the quality of generated operations based on predicted learning outcomes and user satisfaction scores. The models incorporate multi-armed bandit algorithms that balance exploration of novel operation combinations with exploitation of proven successful patterns, utilizing Thompson sampling techniques to select optimal interactive elements 160 configurations for specific learning objectives while maintaining diversity in learning experiences. The reinforcement learning framework implements reward functions that incorporate multiple optimization objectives including completion efficiency metrics extracted from session execution data 170, engagement duration measurements, knowledge retention assessments, and user preference alignment scores derived from user configurations 172. For adaptive operation refinement, the machine learning models 190 implement online learning algorithms that continuously update operation generation policies based on real-time performance feedback, with gradient-based optimization techniques that adjust model parameters to improve future operation quality while preventing overfitting through regularization mechanisms and experience replay buffers that maintain diverse training examples across different user populations and learning contexts.

The operations management module 123 employs generative adversarial networks within the machine learning models 190 architecture to create sophisticated operation element map 134 structures that establish optimal relationships between interactive elements 160 and recommended operations 136. The generator network processes user configurations 172 and session execution data 170 to produce candidate element-operation mappings, while the discriminator network evaluates the quality and pedagogical effectiveness of these mappings based on historical performance data and expert-validated learning design principles. These adversarial training processes enable the system to generate novel element-operation combinations that maintain educational effectiveness while adapting to individual user needs and preferences extracted from user configurations 172. The generative models implement attention-based architectures that analyze compatibility matrices between interactive elements 160 capabilities and recommended operations 136 specifications, utilizing cross-attention mechanisms to identify optimal pairings based on semantic similarity, functional alignment, and user context variables. For dynamic map generation, the machine learning models 190 incorporate graph neural networks that process the operation element map 134 as a bipartite graph structure, with node embeddings representing interactive elements 160 and recommended operations 136, and edge weights indicating compatibility scores derived from user performance patterns stored in session execution data 170. The graph neural networks implement message passing algorithms that propagate compatibility information across the map structure, enabling the identification of indirect relationships and alternative mapping strategies when primary element-operation pairings become unavailable due to technical constraints or resource limitations.

The operations management module 123 implements ensemble learning techniques within the machine learning models 190 framework that combine multiple specialized models to generate comprehensive recommended operations 136 for memory nodes within the custom feature graph 132. These ensemble approaches utilize gradient boosting algorithms that sequentially train weak learners to predict optimal operation characteristics based on user configurations 172 features such as learning style preferences, accessibility requirements, and temporal availability patterns, with each subsequent model focusing on correcting prediction errors from previous models in the ensemble. The system employs random forest algorithms that generate diverse operation candidates through bootstrap sampling of user configurations 172 and session execution data 170, with individual decision trees specializing in different aspects of operation generation such as difficulty scaling, interaction modality selection, and assessment criteria definition. For target learning feature validation, the machine learning models 190 implement multi-task learning architectures that simultaneously optimize for multiple learning objectives including competency acquisition, engagement maintenance, and knowledge retention, with shared representation layers that capture common patterns across different learning domains while task-specific output layers generate specialized recommended operations 136 tailored to individual target learning features 148. The ensemble models incorporate uncertainty quantification mechanisms that provide confidence estimates for generated operations, enabling the operations management module 123 to implement fallback strategies when model predictions indicate high uncertainty and to prioritize high-confidence operation recommendations for critical learning milestones within the custom feature graph 132 progression sequences.

The operations management module 123 can further implement adaptive execution pipelines that dynamically adjust computational resource allocation based on real-time performance metrics and system load indicators. These pipelines can utilize containerized execution environments (e.g., Docker containers with resource limits, Kubernetes pods with quality-of-service classes, OpenShift deployments with auto-scaling policies, and/or the like) that isolate individual learning activities within dedicated runtime contexts, enabling precise resource control and performance monitoring while maintaining security boundaries between concurrent user sessions. The module can implement distributed transaction protocols (e.g., two-phase commit with coordinator election, saga patterns with compensating transactions, outbox patterns with message relay services, and/or the like) that ensure data consistency across multiple system components when updating complex state information such as node completion status, performance metrics, and resource allocations. For validation operations, the operations management module 123 can implement specialized execution environments including sandboxed code evaluation systems that execute user-submitted programming solutions within isolated containers with configurable resource limits and security policies, automated assessment frameworks that compare user-generated artifacts against reference implementations using parameterized similarity metrics, and simulation environments that execute scenario-based evaluations with instrumented performance monitoring to capture quantitative metrics across multiple dimensions including time-to-completion, accuracy, efficiency, and adherence to best practices.

The operations management module 123 can implement specialized memory node progression algorithms that control the sequential unlocking of nodes within the acyclic sequence 212 based on configurable validation criteria. These algorithms can utilize directed graph traversal techniques (e.g., topological sorting with prerequisite enforcement, breadth-first search with level-based progression, depth-first search with branch completion tracking, and/or the like) that systematically evaluate node dependencies and completion status to determine which nodes should be accessible to users at any given time. The module can incorporate adaptive difficulty adjustment mechanisms that dynamically modify validation thresholds based on observed user performance patterns, implementing techniques such as dynamic boundary adjustment that shifts passing thresholds based on statistical analysis of population performance, personalized scaling factors that apply individualized multipliers to standard thresholds based on learning history and demonstrated capabilities, and progressive challenge increments that automatically increase difficulty requirements for users demonstrating mastery-level performance on initial attempts. For multi-user collaborative activities, the operations management module 123 can implement synchronization protocols that coordinate state changes across distributed user sessions, utilizing techniques such as distributed locks with lease-based expiration for managing exclusive access to shared resources, optimistic concurrency control with version vectors for detecting conflicting modifications to shared artifacts, and event-driven state propagation with causal ordering guarantees for maintaining consistent views across multiple concurrent sessions.

The operations management module 123 can implement specialized performance analytics engines that process raw execution data into structured competency metrics for pathway optimization. These engines can utilize multi-dimensional scoring algorithms that combine quantitative metrics (e.g., completion time, accuracy rates, attempt counts) with qualitative assessments (e.g., peer evaluations, rubric-based scoring, complexity analysis) to generate comprehensive performance profiles that accurately represent user capabilities across different learning domains. The module can incorporate competency inference models that apply statistical techniques such as Bayesian knowledge tracing with individualized parameter estimation to calculate probabilistic mastery levels from observed performance patterns, item response theory with adaptive parameter fitting to estimate latent ability factors from assessment responses, and hidden Markov models with state transition matrices to model skill acquisition processes across sequential learning activities. For pathway optimization, the operations management module 123 can implement feedback loop mechanisms that continuously refine learning pathways based on aggregated performance data, utilizing techniques such as A/B testing frameworks that systematically compare alternative node sequences through randomized assignment and statistical outcome analysis, reinforcement learning agents that optimize node selection policies through reward signals derived from learning efficiency metrics, and collaborative filtering algorithms that generate personalized pathway recommendations based on similarity patterns between current users and historical cohorts with successful completion records.

In some implementations, the adaptive learning system 100 can include an interface module 124 that functions as the primary user experience orchestration component responsible for generating, customizing, and dynamically updating the interactive graphical interfaces that enable users to access learning content, complete recommended operations, and navigate through personalized learning pathways. The interface module 124 can be implemented as a responsive web application framework that includes modern frontend technologies (e.g., React.js, Vue.js, Angular, and/or the like) for creating dynamic user interfaces, progressive web application (PWA) capabilities for offline functionality and mobile optimization, and accessibility compliance features (e.g., WCAG 2.1 guidelines, screen reader compatibility, keyboard navigation support, and/or the like) that ensure equitable access for users with diverse abilities and technical requirements. The interface module 124 can utilize advanced user interface design patterns including adaptive layouts that automatically adjust to different screen sizes and device capabilities, interactive visualization components that enable users to manipulate graph structures and explore learning pathways, and real-time feedback mechanisms that provide immediate responses to user actions and progress updates. The interface module 124 can implement personalization algorithms that customize interface elements based on user preferences, learning styles, and accessibility requirements, including customizable color schemes for users with visual impairments, alternative input methods for users with motor disabilities, and multilingual support for users from diverse linguistic backgrounds. For example, the interface module 124 can generate a graph interface 200 for a subject user 106 that displays learning feature categories 210 organized according to the user's career objectives, presents an acyclic sequence 212 of memory nodes with visual indicators distinguishing between validated memory node 220 representing completed activities, pending memory node 222 indicating currently available tasks, and scheduled memory node 224 showing future learning objectives that will become accessible upon completion of prerequisite requirements. As another example, the interface module 124 can create an administrative interface 204 for an admin user 107 that includes function container 260 elements for managing curriculum content, sub-function container 262 components for configuring specific learning activities, and execution element 264 controls that enable testing and validation of administrative changes before deployment to active learning environments. Additionally, the interface module 124 can implement interaction tracking capabilities that monitor user engagement patterns, identify interface elements that cause confusion or difficulty, and generate usability reports that inform continuous interface optimization and user experience improvements.

The interface module 124 can further implement advanced visualization techniques that dynamically render the acyclic sequence 212 using scalable vector graphics (SVG) with WebGL acceleration for complex graph structures containing hundreds of interconnected memory nodes. These visualization techniques can include force-directed graph layouts that automatically position nodes to minimize edge crossings and optimize spatial distribution, hierarchical tree layouts that emphasize the progression structure from core level 230 through intermediary level 232 to terminal level 236, and radial layouts that organize nodes in concentric circles emanating from central starting points. The module can incorporate interactive manipulation capabilities including gesture-based navigation that enables pinch-to-zoom functionality on touchscreen devices, drag-and-drop node repositioning that allows users to customize their view of the learning landscape, and context-sensitive tooltips that display detailed node information when users hover over or focus on specific memory nodes. For accessibility enhancement, the interface module 124 can implement keyboard navigation shortcuts that enable tab-based traversal through the graph structure, voice command recognition that allows hands-free interaction with learning activities, and high-contrast rendering modes that improve visibility for users with visual impairments. The module can utilize WebSockets for bidirectional communication between client interfaces and server components, enabling real-time synchronization of interface state across multiple devices and immediate reflection of changes made by administrative users to learning pathways and content.

The interface module 124 can implement specialized rendering engines for the operation interface 202 that dynamically generate interactive elements 259-1 and 259-2 based on the specific requirements of each recommended operation 254. These rendering engines can utilize component-based architecture with reusable UI elements that maintain consistent interaction patterns across different operation types, while adapting their functionality to the specific validation requirements of each target learning feature 252. The module can incorporate adaptive difficulty controls that dynamically adjust the complexity of interactive elements based on user performance data, implementing techniques such as progressive disclosure that reveals additional functionality as users demonstrate mastery of basic operations, scaffolded assistance that provides contextual help for users struggling with specific interactions, and difficulty scaling that increases challenge levels for users demonstrating advanced capabilities. For collaborative learning scenarios, the interface module 124 can implement shared workspace environments where multiple subject users 106 can simultaneously interact with common interactive elements, with real-time synchronization ensuring that all participants see consistent state information, conflict resolution algorithms managing concurrent modification attempts, and role-based access controls determining which participants can modify specific elements within the shared environment.

The interface module 124 can implement advanced state management architectures that maintain consistent user interface representations across distributed system components. These architectures can utilize Redux-style unidirectional data flow patterns with immutable state objects that prevent inconsistent interface states, action creators that encapsulate user interaction events into structured data objects, reducers that transform state based on dispatched actions, and selectors that efficiently extract and compute derived data from the application state. The module can incorporate optimized rendering techniques including virtual DOM implementations that minimize browser reflow operations by calculating the minimal set of DOM mutations required to reflect state changes, component memoization that prevents unnecessary re-rendering of stable interface elements, and lazy loading strategies that defer the initialization of off-screen components until they enter the viewport. For the administrative interface 204, the interface module 124 can implement specialized editing environments including visual pathway builders that enable drag-and-drop creation of learning sequences, interactive validation tools that verify the pedagogical integrity of newly created pathways, and preview capabilities that allow administrators to experience learning activities from the subject user perspective before publishing. The module can utilize client-side data caching strategies including IndexedDB storage for offline operation, LRU (Least Recently Used) cache eviction policies that optimize memory usage while maintaining frequently accessed data, and optimistic UI updates that immediately reflect user actions while asynchronously confirming changes with server components.

Figure 2A:
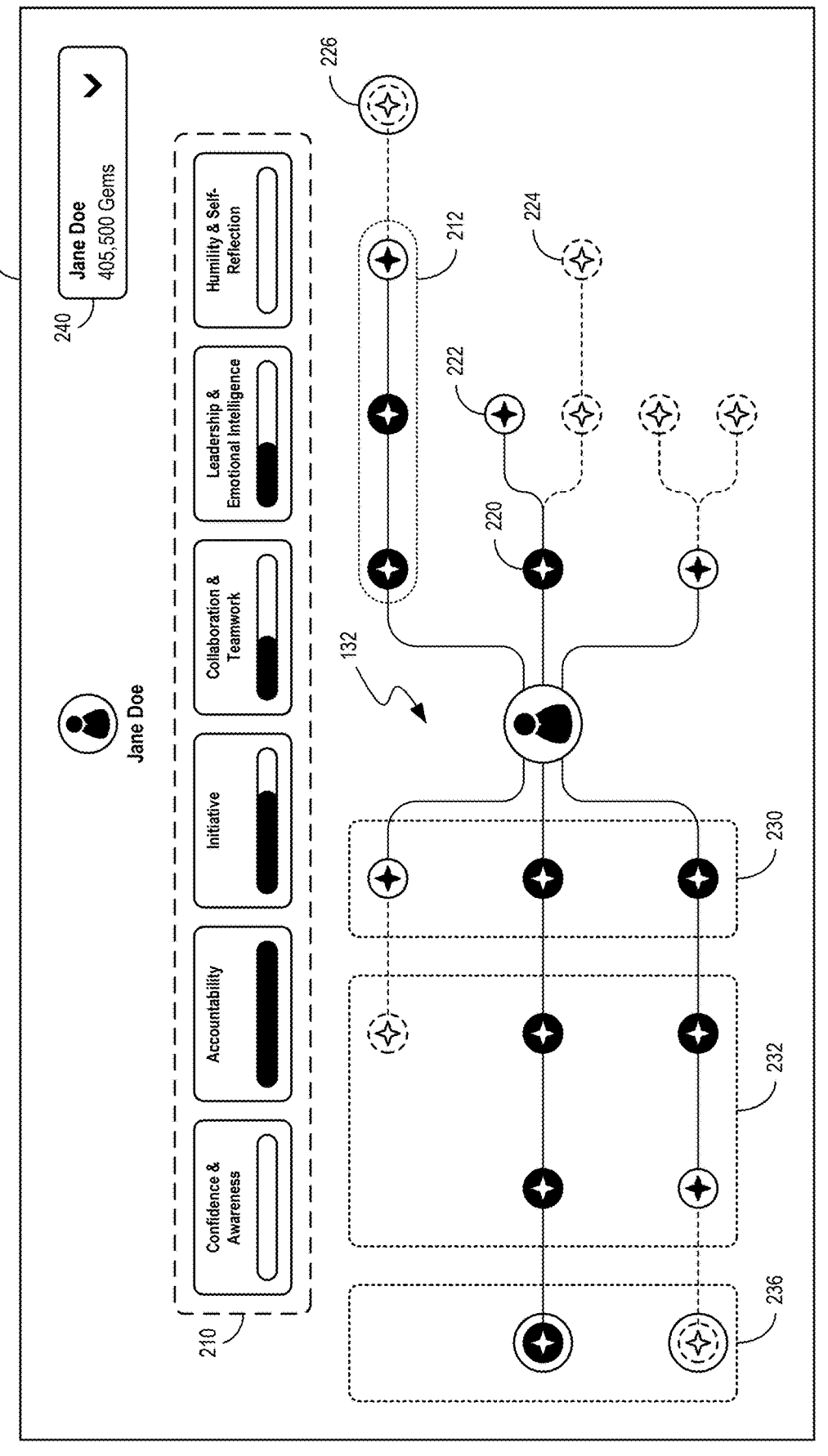
FIGS. 2A-2C are block diagrams that illustrate user interfaces for the adaptive learning system in accordance with some implementations of the present technology.
Figure 2B:
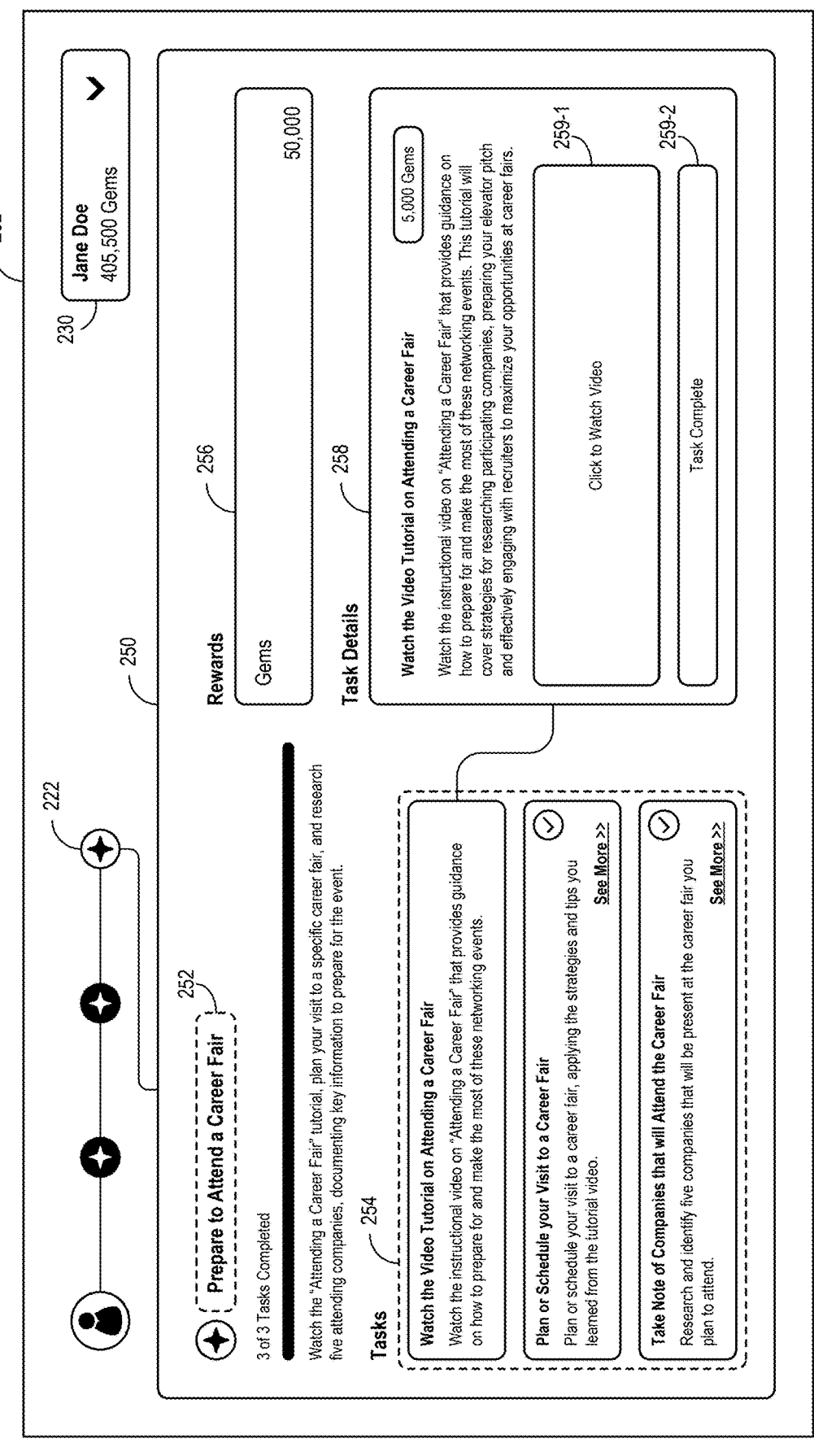
Figure 2C:
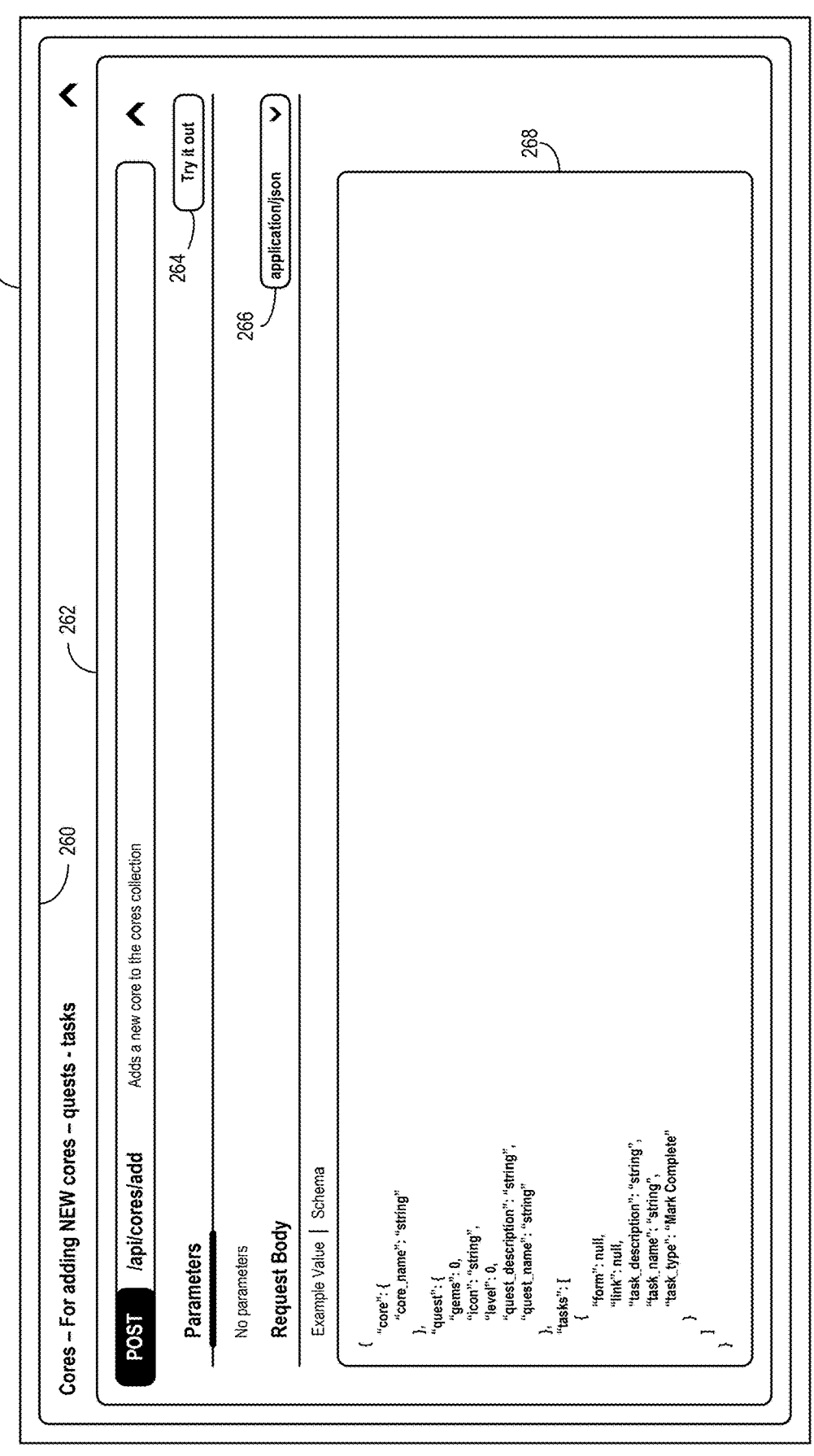

FIGS. 2A-2C are block diagrams that illustrate user interfaces for the adaptive learning system in accordance with some implementations of the present technology. As shown in FIG. 2A, the graph interface 200 can function as a comprehensive visualization framework that generates interactive graphical representations of personalized learning pathways through dynamic rendering of hierarchical node structures and pathway connections. The graph interface 200 can be implemented as a web-based visualization component that utilizes scalable vector graphics (SVG) rendering engines with hardware acceleration support, interactive manipulation libraries (e.g., D3.js with force-directed layout algorithms, Cytoscape.js with graph analysis capabilities, Vis.js with network visualization features, and/or the like), and responsive design frameworks that automatically adapt the visual presentation to different screen sizes and device capabilities. The graph interface 200 can include interactive features such as zooming capabilities that enable users to magnify specific regions of the learning pathway for detailed examination, panning functionality that allows horizontal and vertical navigation across large graph structures, and the ability to move memory nodes around with smooth animations that provide visual feedback during repositioning operations. The graph interface 200 can implement gesture recognition algorithms that detect touch-based interactions on mobile devices (e.g., pinch-to-zoom gestures, swipe navigation, tap selection, and/or the like), mouse-based controls for desktop environments (e.g., scroll wheel zooming, click-and-drag panning, hover state activation, and/or the like), and keyboard navigation shortcuts that enable accessibility compliance for users with motor impairments. For example, the graph interface 200 can generate a leadership development pathway visualization where users can zoom into specific competency clusters to examine detailed task requirements, pan across multiple quest lines to compare alternative progression routes, and drag individual memory nodes to create customized spatial arrangements that align with personal learning preferences and workflow patterns. As another example, the graph interface 200 can render a technical skills progression pathway where smooth animations guide users through sequential node unlocking processes, with visual transitions that highlight newly accessible learning opportunities and fade-out effects that indicate completed activities while maintaining spatial context for overall pathway comprehension. Additionally, the graph interface 200 can implement collaborative visualization modes where multiple subject users can simultaneously view and interact with shared learning pathways, with real-time synchronization ensuring consistent visual states across distributed user sessions and conflict resolution mechanisms that manage concurrent node manipulation attempts through priority-based access controls.

In some implementations, the learning feature categories 210 can function as organizational classification systems that group related learning objectives into thematically coherent clusters for enhanced navigation and comprehension within the graph interface 200. In an example, the learning feature categories include confidence and awareness, accountability, initiative, collaboration and teamwork, leadership and emotional intelligence, and humility and self-reflection. Progress in these categories can be automatically derived based on validated activity, such as degree of progression toward goals and timing of completion of goals. Confidence and awareness scores can be derived based on the user's completion rate of reflective journaling activities and the depth of insights shared. Accountability scores can be derived based on the user's timely completion of tasks and meeting of deadlines, as tracked through the platform's project management tools. Initiative scores can be derived based on the user's frequency of accessing additional learning resources and participating in optional activities. Collaboration and teamwork scores can be derived based on the user's engagement in group discussions and contributions to team projects. Leadership and emotional intelligence scores can be derived based on the user's completion of scenario-based activities that assess their decision-making and empathy skills. Humility and self-reflection scores can be derived based on the user's self-assessment ratings and feedback provided to peers.

The learning feature categories 210 can be implemented as metadata-driven classification structures that utilize taxonomic hierarchies with standardized competency frameworks (e.g., Bloom's Taxonomy with cognitive domain classifications, ESCO Skills Framework with occupational competency mappings, ONET Interest Profiler with career-related skill groupings, and/or the like), semantic tagging systems that enable cross-category relationship identification, and dynamic categorization algorithms that automatically assign learning objectives to appropriate categories based on content analysis and competency alignment metrics. The learning feature categories 210 can include visual representation components that display category labels with distinctive color coding schemes, iconographic symbols that provide intuitive recognition of category types, and progress indicators that show completion percentages across different competency domains. The learning feature categories 210 can implement filtering mechanisms that enable users to selectively display or hide specific categories within the graph interface 200, search functionality that locates learning objectives within particular competency domains, and recommendation engines that suggest related categories based on user interests and career objectives. For example, the learning feature categories 210 can organize leadership competency objectives such as initiative development activities that include goal-setting exercises and proactive problem-solving scenarios, accountability frameworks that encompass responsibility tracking mechanisms and performance evaluation protocols, and collaboration skills that integrate team communication exercises and conflict resolution training modules. As another example, the learning feature categories 210 can structure technical competency domains including programming fundamentals with language-specific coding challenges, data analysis methodologies with statistical modeling exercises, and system design principles with architecture planning activities that progress from basic concepts to advanced implementation strategies. Additionally, the learning feature categories 210 can implement adaptive categorization systems that dynamically adjust category prominence and visibility based on user engagement patterns, with machine learning algorithms analyzing interaction data to identify frequently accessed competency domains and automatically promoting relevant categories to prominent positions within the graph interface 200 layout.

In some implementations, the acyclic sequence 212 can function as a directed graph structure that represents sequential learning progressions without circular dependencies, ensuring logical prerequisite relationships and preventing infinite loops within the learning pathway architecture. The acyclic sequence 212 can be implemented using graph theory algorithms that enforce topological ordering constraints through depth-first search traversal with cycle detection mechanisms, adjacency list representations that efficiently store node relationships and edge properties, and dynamic programming techniques that calculate optimal pathway lengths and completion time estimates based on historical performance data. The acyclic sequence 212 can be organized into three hierarchical levels including a fixed base level for self-exploration activities that collect foundational competency data, an interoperable intermediate level for career identification processes that build upon self-awareness insights, and an advanced custom level for specialized career goals that provide targeted skill development opportunities. The acyclic sequence 212 can include validation mechanisms that verify prerequisite completion before unlocking subsequent nodes, branching logic that creates alternative pathways based on user preferences and performance indicators, and convergence points that reunite divergent learning paths at strategic progression milestones. For example, the acyclic sequence 212 can generate a data science career pathway that begins with foundational mathematics and statistics nodes at the core level 230, progresses through programming language acquisition and data manipulation techniques at the intermediary level 232, and culminates in specialized machine learning implementation and research methodology nodes at the terminal level 236, with each progression stage requiring validated completion of prerequisite competencies before advancing to subsequent learning objectives. As another example, the acyclic sequence 212 can construct a business leadership development pathway where initial self-assessment and communication skills nodes establish foundational competencies, intermediate project management and team coordination activities build practical leadership experience, and advanced strategic planning and organizational development nodes provide executive-level skill development opportunities. Additionally, the acyclic sequence 212 can implement adaptive pathway modification algorithms that dynamically adjust node sequences based on real-time performance data, with reinforcement learning models analyzing completion patterns to optimize learning efficiency and engagement levels while maintaining pedagogical integrity through constraint satisfaction mechanisms.

In some implementations, the validated memory node 220 can function as a completed learning milestone indicator that represents successfully accomplished learning objectives within the acyclic sequence 212 structure. The validated memory node 220 can be implemented as a state-managed data structure that stores completion timestamps with precision measurements, performance metrics including accuracy scores and completion duration data, and validation criteria that define the specific requirements for achieving validated status. The validated memory node 220 can include visual representation components that display distinctive styling elements (e.g., green coloration schemes, checkmark iconography, completion badges, and/or the like) to provide immediate recognition of accomplished learning objectives, progress contribution calculations that quantify the node's impact on overall pathway completion percentages, and historical tracking mechanisms that maintain detailed records of validation events and associated performance data. The validated memory node 220 can implement retrospective analysis capabilities that enable users to review completed activities, access archived learning materials and assessment results, and generate competency certificates that document validated skill achievements for professional credentialing purposes. For example, the validated memory node 220 can represent a completed programming fundamentals module where the subject user has successfully demonstrated proficiency through automated code evaluation systems, peer review assessments, and practical project implementations, with the validation status triggering the unlocking of advanced programming concepts and specialized language-specific learning pathways. As another example, the validated memory node 220 can indicate successful completion of a leadership communication workshop where validation criteria included participation in role-playing exercises, submission of reflective analysis documents, and achievement of minimum scores on communication effectiveness assessments, with the validated status contributing to overall leadership competency progression and enabling access to advanced interpersonal skills development activities. Additionally, the validated memory node 220 can implement transferability analysis algorithms that evaluate the applicability of validated competencies to alternative learning pathways, with machine learning models analyzing skill overlap patterns to recommend related learning opportunities and generate personalized pathway suggestions based on demonstrated competency achievements.

In some implementations, the pending memory node 222 can function as an active learning opportunity indicator that represents currently accessible learning objectives within the acyclic sequence 212 that await user engagement and completion. The pending memory node 222 can be implemented as a dynamic state container that maintains real-time availability status based on prerequisite completion verification, stores interactive elements that cause at least one first recommended operation to validate a first target learning feature for the subject user, and includes priority ranking algorithms that determine presentation order when multiple nodes achieve pending status simultaneously. The pending memory node 222 can include visual representation components that display distinctive styling elements (e.g., highlighted borders, pulsing animations, call-to-action indicators, and/or the like) to attract user attention and encourage engagement, estimated completion time calculations that provide users with workload planning information, and difficulty level indicators that help users select appropriate learning activities based on current competency levels and available time resources. The pending memory node 222 can implement recommendation algorithms that analyze user learning patterns and preferences to suggest optimal engagement timing, adaptive content delivery mechanisms that customize learning materials based on individual learning styles and accessibility requirements, and progress tracking systems that monitor partial completion status for complex multi-stage learning activities. For example, the pending memory node 222 can represent an available data visualization project where the subject user can access interactive coding environments, tutorial materials, and assessment frameworks, with the node displaying estimated completion time of four hours and prerequisite verification confirming successful completion of foundational statistics and programming language modules. As another example, the pending memory node 222 can indicate an accessible team leadership simulation exercise where users can engage with virtual team management scenarios, decision-making challenges, and performance evaluation activities, with the node providing difficulty level indicators and recommended preparation materials based on previously validated communication and project management competencies. Additionally, the pending memory node 222 can implement intelligent scheduling algorithms that analyze user availability patterns and learning velocity metrics to generate optimal engagement recommendations, with calendar integration capabilities that automatically schedule learning sessions and send reminder notifications to maximize completion likelihood and learning retention effectiveness.

In some implementations, the scheduled memory node 224 can function as a future learning objective placeholder that represents learning opportunities within the acyclic sequence 212 that will become accessible upon completion of prerequisite requirements and validation of dependent competencies. The scheduled memory node 224 can be implemented as a conditional access container that maintains dependency tracking mechanisms through prerequisite relationship monitoring, stores preview information that provides users with advance visibility into upcoming learning opportunities, and includes estimation algorithms that calculate projected availability dates based on current progress velocity and remaining prerequisite requirements. The scheduled memory node 224 can include visual representation components that display distinctive styling elements (e.g., grayed-out appearance, lock iconography, progress indicators showing prerequisite completion status, and/or the like) to communicate future accessibility while maintaining pathway visibility, dependency visualization features that highlight the specific prerequisite nodes that must be completed for unlocking, and motivational elements that encourage continued progress toward accessing advanced learning opportunities. The scheduled memory node 224 can implement predictive analytics capabilities that forecast optimal engagement timing based on learning velocity patterns, adaptive difficulty scaling that adjusts complexity requirements based on demonstrated competency growth, and personalized recommendation systems that suggest alternative pathway routes for accessing desired learning objectives more efficiently. For example, the scheduled memory node 224 can represent an advanced machine learning specialization module that requires completion of foundational mathematics, programming proficiency, and basic statistics nodes, with the scheduled status displaying a progress indicator showing 60% prerequisite completion and estimated availability in three weeks based on current learning velocity patterns. As another example, the scheduled memory node 224 can indicate a senior leadership capstone project that depends on validation of intermediate management competencies, strategic thinking assessments, and team coordination exercises, with the node providing preview materials that outline project requirements and expected learning outcomes to maintain user motivation and pathway engagement. Additionally, the scheduled memory node 224 can implement adaptive unlocking mechanisms that dynamically adjust prerequisite requirements based on demonstrated exceptional performance in related competency areas, with machine learning models analyzing competency transfer patterns to identify opportunities for accelerated progression while maintaining pedagogical integrity and learning effectiveness standards.

In some implementations, a terminal node indicator 226 can function as a pathway completion marker that represents the ultimate learning destination within specific quest lines of the acyclic sequence 212 structure. The terminal node indicator 226 can be implemented as a specialized visual component that utilizes distinctive graphical elements (e.g., star iconography, achievement badges, completion certificates, and/or the like) to signify the culmination of learning pathway segments, includes comprehensive competency validation mechanisms that verify mastery of all prerequisite learning objectives, and stores achievement documentation that provides formal recognition of completed educational sequences. The terminal node indicator 226 can include celebration mechanisms that provide positive reinforcement through visual animations and achievement notifications, portfolio integration features that automatically generate competency documentation for professional credentialing purposes, and pathway transition recommendations that suggest related learning opportunities for continued skill development beyond the completed sequence. The terminal node indicator 226 can implement comprehensive assessment protocols that evaluate cumulative learning outcomes through capstone projects, practical demonstrations, and peer evaluation processes to ensure thorough competency validation before terminal status assignment. For example, the terminal node indicator 226 can represent the completion of a comprehensive data science specialization pathway where the subject user has successfully validated competencies in statistical analysis, programming implementation, machine learning model development, and data visualization techniques, with the terminal status triggering the generation of a professional competency certificate and recommendations for advanced research methodology or industry-specific application pathways. As another example, the terminal node indicator 226 can indicate successful completion of an executive leadership development sequence where validation includes strategic planning project completion, team management simulation success, and organizational change implementation demonstrations, with the terminal achievement unlocking access to specialized industry leadership tracks and executive mentorship opportunities. Additionally, the terminal node indicator 226 can implement competency transfer analysis algorithms that evaluate the applicability of completed pathway achievements to alternative career trajectories, with recommendation engines suggesting complementary skill development opportunities and advanced specialization pathways that build upon validated terminal competencies.

In some implementations, a custom feature graph 132 can function as a personalized learning pathway visualization system that dynamically generates and displays individualized node structures and connection patterns based on user-specific competency requirements and career objectives. The custom feature graph 132 can be implemented as an adaptive graph generation engine that utilizes machine learning models to analyze user profile data including learning preferences, performance history, and career goals, applies graph construction algorithms that create optimized pathway structures with personalized node sequences and branching patterns, and includes real-time modification capabilities that adjust graph topology based on ongoing performance feedback and changing user requirements. The custom feature graph 132 can include personalization algorithms that customize node content, difficulty progression, and learning activity types based on individual learning styles and accessibility needs, dynamic pathway optimization mechanisms that continuously refine learning sequences based on performance data and engagement patterns, and collaborative features that enable shared learning experiences while maintaining individualized progression tracking. The custom feature graph 132 can implement intelligent content curation systems that select appropriate interactive elements for each memory node based on competency alignment, learning effectiveness metrics, and user engagement predictions derived from historical interaction data. For example, the custom feature graph 132 can generate a personalized cybersecurity career pathway for a subject user with strong mathematical background but limited programming experience, creating a customized sequence that accelerates through foundational mathematics nodes while providing comprehensive programming skill development activities, specialized security protocol training modules, and hands-on penetration testing exercises tailored to the user's learning pace and career timeline requirements. As another example, the custom feature graph 132 can construct an individualized healthcare administration pathway that adapts to a user's existing clinical experience by bypassing basic medical terminology nodes while emphasizing healthcare policy analysis, financial management competencies, and regulatory compliance training activities that align with the user's transition from clinical practice to administrative leadership roles. Additionally, the custom feature graph 132 can implement collaborative pathway sharing mechanisms that enable users to contribute successful learning sequences to community knowledge bases, with peer review systems that validate pathway effectiveness and recommendation algorithms that suggest proven pathway structures to users with similar competency profiles and career objectives.

In some implementations, a user account 240 can function as a comprehensive profile management system that stores individual user data, tracks learning progress across multiple pathway sequences, and maintains persistent state information for personalized learning experiences within the graph interface 200. The user account 240 can be implemented as a secure data repository that includes authentication mechanisms with multi-factor verification protocols, encrypted storage systems that protect sensitive personal and performance information, and synchronization capabilities that maintain consistent user state across multiple devices and platform access points. The user account 240 can include a profile section showing progress in relation to core skill categories with visual indicators like color changes to indicate completion status, competency tracking dashboards that display achievement levels across different learning domains, and historical analytics that provide insights into learning velocity patterns and performance trends over time. The user account 240 can implement personalization engines that customize learning recommendations based on stored preference data, adaptive difficulty systems that adjust challenge levels based on demonstrated competency growth, and goal-setting frameworks that enable users to define and track progress toward specific career and educational objectives. For example, the user account 240 can maintain comprehensive progress tracking for a subject user pursuing multiple concurrent learning pathways, displaying completion percentages for leadership development (75% complete with green progress indicators), technical skills advancement (45% complete with yellow progress indicators), and professional certification preparation (20% complete with red progress indicators), with detailed breakdowns showing validated competencies, pending activities, and projected completion timelines for each pathway segment. As another example, the user account 240 can store personalized learning preferences including visual learning style indicators that prioritize video-based content and interactive simulations, accessibility requirements that enable screen reader compatibility and keyboard navigation support, and scheduling preferences that optimize learning activity recommendations for evening and weekend availability patterns. Additionally, the user account 240 can implement social learning features that enable users to connect with peers pursuing similar learning objectives, share achievement milestones and competency validations, and participate in collaborative learning activities while maintaining privacy controls that allow selective sharing of progress information and learning accomplishments.

As shown in FIG. 2B, the operation interface 202 can function as a comprehensive task execution environment that provides subject users with detailed access to learning activities and interactive components within individual memory nodes of the acyclic sequence. The operation interface 202 can be implemented as a dynamic content delivery system that includes responsive web interface frameworks (e.g., React.js with component-based architecture, Vue.js with reactive data binding, Angular with dependency injection patterns, and/or the like) for rendering task-specific content, state management libraries (e.g., Redux with immutable state containers, MobX with observable data structures, Vuex with centralized state management, and/or the like) for maintaining consistent interface behavior across user interactions, and accessibility compliance mechanisms (e.g., ARIA labels for screen reader compatibility, keyboard navigation support with focus management, high contrast rendering modes for visual accessibility, and/or the like) that ensure equitable access for users with diverse technical requirements and capabilities. The operation interface 202 can include real-time data synchronization protocols that maintain consistent state information between client interfaces and server components through WebSocket connections with automatic reconnection handling, bidirectional communication channels that enable immediate reflection of user actions and progress updates, and conflict resolution algorithms that manage concurrent access attempts when multiple users interact with shared learning resources simultaneously. For example, the operation interface 202 can generate a comprehensive programming exercise environment where the subject user accesses an integrated development environment with syntax highlighting, code completion features, and real-time error detection capabilities, while simultaneously displaying instructional videos, reference documentation, and peer collaboration tools within a unified interface that maintains consistent navigation patterns and visual design elements throughout the learning session. As another example, the operation interface 202 can render a business case study analysis workspace where users access multimedia presentation materials, interactive decision-making frameworks, and collaborative discussion platforms, with the interface providing seamless transitions between different activity types while maintaining persistent progress tracking and automatic saving of user-generated content across all interaction modalities. Additionally, the operation interface 202 can implement adaptive interface customization algorithms that analyze user interaction patterns and preferences to automatically adjust layout configurations, content presentation formats, and navigation structures to optimize learning efficiency and user engagement based on demonstrated usage behaviors and accessibility requirements.

In some implementations, a feature container 250 can function as a structured information display component within the operation interface 202 that organizes and presents learning objective details and associated task requirements for individual memory nodes. The feature container 250 can be implemented as a modular interface element that includes expandable content sections with accordion-style navigation controls, responsive layout algorithms that automatically adjust content presentation based on screen size and device capabilities, and semantic markup structures (e.g., HTML5 semantic elements with role attributes, structured data schemas with JSON-LD formatting, microdata annotations with vocabulary.org specifications, and/or the like) that enhance accessibility and search engine optimization for educational content discovery. The feature container 250 can include visual hierarchy systems that utilize typography scaling, color coding schemes, and spatial organization principles to guide user attention toward critical information elements, progress tracking indicators that display completion status and remaining task requirements, and contextual help mechanisms that provide on-demand explanations and guidance for complex learning concepts. The feature container 250 can implement dynamic content loading capabilities that fetch relevant learning materials from the interactive element repository 152 based on user progression status and competency requirements, with caching mechanisms that optimize performance through intelligent prefetching of likely next content elements and compression algorithms that minimize bandwidth usage for multimedia resources. For example, the feature container 250 can display a comprehensive data analysis project overview that includes learning objective descriptions with measurable outcome criteria, prerequisite skill verification checklists with completion status indicators, estimated time requirements with difficulty level assessments, and resource availability notifications that inform users about required software tools and dataset access requirements. As another example, the feature container 250 can present a leadership development workshop summary that encompasses competency framework alignments with industry standard mappings, collaborative activity descriptions with role assignment details, assessment criteria explanations with rubric specifications, and preparation material recommendations with priority rankings based on individual learning history and identified knowledge gaps. Additionally, the feature container 250 can implement personalization algorithms that customize content presentation based on user learning preferences stored in the user account 240, with adaptive text sizing for visual accessibility requirements, alternative content formats for different learning modalities, and language localization support that automatically translates interface elements and instructional content based on user profile settings and geographic location data.

In some implementations, a target learning feature 252 can function as a specific competency objective definition within the feature container 250 that articulates the measurable learning outcomes and skill development goals for individual memory nodes. The target learning feature 252 can be implemented as a structured data object that includes competency taxonomy classifications (e.g., Bloom's Taxonomy cognitive levels with knowledge, comprehension, application, analysis, synthesis, and evaluation categories, SOLO Taxonomy with structural complexity indicators, Webb's Depth of Knowledge framework with cognitive complexity measurements, and/or the like) for standardized skill categorization, measurable outcome specifications with quantitative assessment criteria, and prerequisite relationship mappings that define dependency connections to previously validated competencies. The target learning feature 252 can include detailed competency descriptions that utilize action-oriented language with specific performance verbs, contextual application scenarios that demonstrate real-world skill utilization, and assessment methodology explanations that clarify validation requirements and success criteria for competency achievement. The target learning feature 252 can implement adaptive difficulty scaling mechanisms that adjust complexity requirements based on user performance history and demonstrated competency levels, with machine learning algorithms analyzing completion patterns to optimize challenge levels and maintain engagement without causing cognitive overload or frustration. For example, the target learning feature 252 can define a Python programming competency objective that specifies the ability to implement object-oriented design patterns with inheritance and polymorphism concepts, create unit testing frameworks with automated validation procedures, and optimize algorithm performance through complexity analysis and code refactoring techniques, with assessment criteria requiring successful completion of coding challenges that demonstrate practical application of these concepts in realistic software development scenarios. As another example, the target learning feature 252 can articulate a project management competency that encompasses stakeholder communication skills with conflict resolution capabilities, resource allocation optimization with budget constraint management, and risk assessment methodologies with mitigation strategy development, with validation requirements including successful completion of simulated project scenarios that test decision-making abilities under time pressure and resource limitations. Additionally, the target learning feature 252 can implement competency transfer analysis algorithms that evaluate the applicability of validated skills to alternative career pathways and learning objectives, with recommendation engines suggesting complementary competencies that enhance overall skill portfolio value and career advancement opportunities based on industry demand patterns and professional development trends.

In some implementations, recommended operations 254 can function as specific task sequences and validation activities within the feature container 250 that subject users must complete to demonstrate mastery of the target learning feature 252. The recommended operations 254 can be implemented as structured workflow definitions that include sequential task ordering with dependency relationships, validation checkpoints with automated assessment mechanisms, and performance measurement protocols (e.g., completion time tracking with statistical analysis, accuracy scoring with weighted rubric systems, effort estimation with cognitive load assessment, and/or the like) that generate quantitative metrics for competency evaluation. The recommended operations 254 can include assessment tasks configured to collect participant data and self-awareness activities that inform generation of tasks in higher levels of the acyclic sequence, with data collection mechanisms that capture learning preferences, performance patterns, and competency development trajectories for personalized pathway optimization. The recommended operations 254 can implement adaptive complexity adjustment algorithms that modify task difficulty based on real-time performance feedback, with dynamic parameter tuning that maintains optimal challenge levels while preventing cognitive overload through intelligent workload distribution and pacing controls. For example, the recommended operations 254 can define a comprehensive software development workflow that includes code repository setup with version control configuration, collaborative development practices with peer review protocols, automated testing implementation with continuous integration pipelines, and deployment procedures with production environment management, with each operation requiring successful completion before progression to subsequent development phases and validation through practical demonstration of working software solutions. As another example, the recommended operations 254 can specify a business strategy analysis sequence that encompasses market research activities with competitive analysis frameworks, financial modeling exercises with scenario planning methodologies, stakeholder consultation processes with communication strategy development, and implementation planning with resource allocation optimization, with validation requiring submission of comprehensive strategy documents that demonstrate analytical thinking and practical application of business principles. Additionally, the recommended operations 254 can implement intelligent sequencing algorithms that optimize task ordering based on pedagogical effectiveness research and individual learning pattern analysis, with machine learning models analyzing completion success rates across different task arrangements to identify optimal learning sequences that maximize competency acquisition while minimizing time investment and cognitive effort requirements.

In some implementations, allocable resources 256 can function as digital currency or credit systems within the feature container 250 that provide incentive mechanisms and progress tracking capabilities for subject users completing learning activities. The allocable resources 256 can be implemented as a blockchain-based token system (e.g., Ethereum smart contracts with ERC-20 token standards, Hyperledger Fabric with permissioned network architecture, Polygon with layer-2 scaling solutions, and/or the like) that maintains transparent transaction records and prevents fraudulent manipulation of resource balances, database-driven point systems with cryptographic security measures that ensure data integrity and prevent unauthorized modifications, and gamification frameworks that incorporate achievement badges, leaderboard rankings, and milestone rewards to enhance user engagement and motivation. The allocable resources 256 can include automatic distribution mechanisms that add a predefined quantity of the allocable resources to the user account when the one or more performance measures satisfy the tolerance threshold, with configurable reward algorithms that adjust resource allocation based on task difficulty, completion quality, and time efficiency metrics. The allocable resources 256 can implement exchange mechanisms that enable users to utilize accumulated resources for accessing premium learning content, purchasing additional assessment attempts, and unlocking advanced pathway options that provide accelerated progression opportunities and specialized skill development tracks. For example, the allocable resources 256 can function as a comprehensive learning credit system where subject users earn digital tokens for completing programming exercises with successful code compilation and test case validation, participating in peer review activities with constructive feedback provision, and achieving milestone completions within specified timeframes, with earned resources enabling access to advanced development tools, specialized course materials, and one-on-one mentoring sessions with industry professionals. As another example, the allocable resources 256 can operate as an achievement point system where users accumulate credits for demonstrating leadership competencies through simulation exercises, collaborative project contributions, and peer evaluation scores, with resource balances enabling redemption for professional certification exam vouchers, conference attendance opportunities, and networking event access that support career advancement objectives. Additionally, the allocable resources 256 can implement social learning features that enable resource sharing between users for collaborative project funding, peer tutoring compensation, and group achievement rewards that encourage community engagement and mutual support within the adaptive learning system 100 environment.

In some implementations, an operation container 258 can function as a comprehensive task management interface within the operation interface 202 that organizes and presents interactive learning activities with streamlined navigation capabilities for continuous task progression. The operation container 258 can be implemented as a responsive interface framework that includes tabbed navigation systems with keyboard accessibility support, progressive disclosure mechanisms that reveal task complexity gradually to prevent cognitive overload, and breadcrumb navigation elements (e.g., hierarchical path indicators with clickable segments, progress visualization with completion percentages, contextual location markers with return navigation options, and/or the like) that maintain user orientation within complex learning sequences. The operation container 258 can include a streamlined navigation system enabling continuous progression through tasks without returning to the main graph interface view, with automatic advancement mechanisms that transition users to subsequent activities upon successful completion validation and intelligent bookmarking systems that preserve progress state across session interruptions and device changes. The operation container 258 can implement task orchestration algorithms that coordinate multiple concurrent learning activities, manage resource dependencies between related tasks, and optimize scheduling based on user availability patterns and cognitive load considerations derived from interaction analytics and performance monitoring data. For example, the operation container 258 can organize a comprehensive web development project sequence that includes HTML structure creation with semantic markup validation, CSS styling implementation with responsive design testing, JavaScript functionality development with debugging and optimization procedures, and deployment configuration with performance monitoring setup, with the container providing seamless transitions between development phases while maintaining persistent access to reference materials, debugging tools, and peer collaboration features throughout the entire development workflow. As another example, the operation container 258 can structure a business case analysis workflow that encompasses problem identification with stakeholder interview protocols, data collection procedures with statistical analysis requirements, solution development with cost-benefit evaluation frameworks, and presentation preparation with audience-specific communication strategies, with the container enabling fluid movement between analysis phases while preserving research findings, calculation results, and draft materials across all workflow stages. Additionally, the operation container 258 can implement adaptive workflow customization that analyzes user interaction patterns to identify preferred task sequences and interface configurations, with machine learning algorithms optimizing container layout and navigation structures based on individual productivity patterns and learning effectiveness metrics derived from completion rates and quality assessments.

In some implementations, an interactive element 259-1 can function as a multimedia engagement component within the operation container 258 that provides subject users with diverse interaction modalities for completing portions of recommended operations. The interactive element 259-1 can be implemented as a modular interface component that includes video playback components with adaptive bitrate streaming for optimal performance across different network conditions, web link activation interfaces that open external resources in configurable display modes, document download mechanisms with format conversion capabilities, and form submission interfaces with real-time validation and error handling protocols. The interactive element 259-1 can include user activation mechanisms that receive, via the interactive graphical interface, user activation of at least one interactive element from the first set of interactive elements stored by the first memory node, with event handling systems that capture interaction data and trigger appropriate response workflows based on element type and user context. The interactive element 259-1 can implement accessibility compliance features that support assistive technologies through ARIA labeling, keyboard navigation compatibility, and alternative content formats that accommodate users with visual, auditory, or motor impairments while maintaining full functionality across all interaction modalities. For example, the interactive element 259-1 can function as an integrated video learning component that displays instructional content with closed captioning support, interactive transcript navigation with keyword search capabilities, playback speed controls with bookmark functionality, and embedded quiz questions that appear at strategic intervals to reinforce learning concepts and assess comprehension levels throughout the viewing experience. As another example, the interactive element 259-1 can operate as a document processing interface that enables users to upload assignment files with automatic format validation, access downloadable templates with pre-configured formatting and structure guidelines, and submit completed work through secure file transfer protocols with version control and submission timestamp recording for academic integrity verification. Additionally, the interactive element 259-1 can implement intelligent content adaptation algorithms that analyze user interaction patterns and learning preferences to automatically customize presentation formats, adjust complexity levels, and recommend alternative content modalities that optimize learning effectiveness based on individual cognitive processing styles and demonstrated competency development patterns.

In some implementations, an interactive element 259-2 can function as a complementary engagement component within the operation container 258 that provides additional interaction capabilities and automatically generates supplementary learning activities based on user performance and progression requirements. The interactive element 259-2 can be implemented as an adaptive content generation system that includes machine learning algorithms for analyzing user interaction data, natural language processing capabilities for creating personalized learning materials, and dynamic interface rendering systems that automatically generate for display, at the interactive graphical interface, a third set of interactive elements which, when used by the subject user, cause a portion of the at least one first recommended operation. The interactive element 259-2 can include intelligent content curation mechanisms that select appropriate learning resources from the interactive element repository

152 based on competency alignment scores, user engagement predictions, and pedagogical effectiveness metrics derived from historical performance data across similar user cohorts. The interactive element 259-2 can implement collaborative learning features that enable peer interaction through discussion forums, group project coordination tools, and real-time communication channels that support synchronous and asynchronous collaboration while maintaining individual progress tracking and assessment capabilities. For example, the interactive element 259-2 can function as an adaptive coding practice environment that automatically generates programming challenges based on user skill level assessment, provides real-time syntax highlighting and error detection feedback, offers contextual help suggestions with code completion recommendations, and creates personalized debugging exercises that target specific areas where the user demonstrates knowledge gaps or recurring error patterns. As another example, the interactive element 259-2 can operate as a dynamic case study generator that creates business scenario simulations tailored to user career objectives and demonstrated competency levels, provides interactive decision-making frameworks with consequence modeling capabilities, and generates follow-up analysis questions that encourage critical thinking and application of theoretical concepts to practical business situations. Additionally, the interactive element 259-2 can implement predictive learning analytics that forecast optimal engagement timing and content sequencing based on user behavior patterns, with recommendation engines that suggest complementary learning activities and alternative pathway routes that enhance overall competency development while maintaining alignment with career objectives and time availability constraints.

In some implementations, the operation interface 202 can implement comprehensive user interaction tracking mechanisms that receive, via the interactive graphical interface, a user selection of at least one graphical indicator representing the first memory node within the at least one acyclic sequence of one or more memory nodes, and automatically generate for display, at the interactive graphical interface, a sequential arrangement of one or more graphical containers. The operation interface 202 can be implemented with selection detection algorithms that utilize event listeners for mouse click events, touch gesture recognition for mobile device interactions, and keyboard input handlers for accessibility compliance, with each selection triggering dynamic content loading procedures that fetch relevant task information from the development record repository 150 and render appropriate interface components based on memory node type and user authorization levels. The operation interface 202 can include graphical container generation systems that create each graphical container indicating a subset of interactive elements from the first set of interactive elements which, when used by the subject user, cause a portion of the at least one first recommended operation, with container organization algorithms that group related tasks based on competency alignment, difficulty progression, and estimated completion time requirements. The operation interface 202 can implement intelligent container sequencing that analyzes user performance history and learning preferences to optimize task presentation order, with priority ranking systems that promote high-impact learning activities and adaptive scheduling mechanisms that distribute cognitive workload across available time periods to prevent mental fatigue and maintain engagement levels. For example, the operation interface 202 can respond to user selection of a data science project memory node by automatically generating a sequential arrangement of graphical containers that include data preprocessing tasks with dataset cleaning and validation procedures, exploratory data analysis activities with statistical visualization requirements, machine learning model development with algorithm selection and parameter tuning exercises, and results interpretation tasks with presentation and documentation requirements, with each container displaying estimated completion times, prerequisite verification status, and available resource links for successful task completion. As another example, the operation interface 202 can process user selection of a leadership development memory node by creating graphical containers that encompass self-assessment questionnaires with personality and communication style evaluations, team simulation exercises with role-playing scenarios and conflict resolution challenges, strategic planning activities with goal-setting and resource allocation tasks, and peer feedback collection with structured evaluation forms and improvement planning frameworks. Additionally, the operation interface 202 can implement container customization capabilities that enable users to modify task sequences based on personal preferences and time constraints, with drag-and-drop reordering functionality, optional task selection mechanisms, and alternative pathway suggestions that maintain pedagogical integrity while accommodating individual learning styles and scheduling requirements.

In some implementations, the operation interface 202 can implement sophisticated reward distribution mechanisms that access a user account associated with the subject user that stores allocable resources for a digital exchange platform, with automated resource allocation systems that monitor performance metrics and trigger reward distribution when validation criteria are satisfied. The operation interface 202 can be implemented with performance monitoring algorithms that continuously track user progress across multiple task completion dimensions including accuracy scores, time efficiency metrics, effort investment measurements, and quality assessments derived from automated evaluation systems and peer review processes. The operation interface 202 can include threshold evaluation mechanisms that compare current performance measures against predefined tolerance thresholds with statistical confidence intervals, utilizing Bayesian inference algorithms to account for measurement uncertainty and individual performance variability when determining reward eligibility. The operation interface 202 can implement secure transaction processing systems that utilize cryptographic protocols for resource transfer operations, audit trail maintenance for accountability and fraud prevention, and real-time balance updates that reflect resource changes across all user interface components and external system integrations. For example, the operation interface 202 can monitor a subject user completing a comprehensive software engineering project that includes code quality assessments with automated testing validation, documentation completeness evaluations with peer review scoring, and deployment success verification with performance benchmarking, with the system automatically adding predetermined quantities of digital learning credits to the user account when combined performance scores exceed established thresholds, enabling access to advanced development tools and specialized training modules. As another example, the operation interface 202 can track user engagement in collaborative business strategy development activities that encompass market analysis accuracy with data validation requirements, presentation quality assessments with stakeholder feedback integration, and implementation feasibility evaluations with expert review processes, with successful completion triggering automatic allocation of professional development points that can be redeemed for industry certification exam vouchers and networking event access opportunities. Additionally, the operation interface 202 can implement dynamic threshold adjustment algorithms that modify reward criteria based on user progression patterns and competency development trajectories, with machine learning models analyzing historical performance data to optimize reward distribution timing and quantities for maximum motivational impact while maintaining fair and consistent evaluation standards across diverse user populations and learning pathway variations.

As shown in FIG. 2C, the administrative interface 204 can function as a comprehensive content management and system configuration platform that enables admin users 107 to customize and control the operational parameters of the graph generation module 122 and operations management module 123 for organizational-level learning pathway deployment. The administrative interface 204 can be implemented as a web-based administrative dashboard that includes role-based access control systems (e.g., OAuth 2.0 with administrative scope permissions, SAML with federated identity management for enterprise integration, Active Directory with group-based authorization policies, and/or the like) for securing administrative functions, RESTful API management interfaces (e.g., OpenAPI specification with interactive documentation, GraphQL endpoints with schema introspection capabilities, webhook configuration with event-driven notifications, and/or the like) for programmatic system configuration, and responsive design frameworks (e.g., Bootstrap with grid-based layouts, Material-UI with component libraries, Tailwind CSS with utility-first styling, and/or the like) that adapt to different screen sizes and administrative workflow requirements. The administrative interface 204 can include task list definition tools that enable admin users 107 to create structured learning sequences by defining memory node specifications with interactive elements 160 assignments, establishing prerequisite relationships between nodes within the acyclic sequence 212, and configuring validation criteria that determine progression requirements for subject users 106 advancing through personalized learning pathways. The administrative interface 204 can implement content source authorization controls that allow admin users 107 to specify approved educational resources from the interactive element repository 152, establish content quality standards with automated validation mechanisms, and configure integration protocols with external systems (e.g., Learning Management Systems with API authentication, content repositories with metadata synchronization, educational databases with search indexing, and/or the like) that expand available learning materials while maintaining pedagogical consistency and institutional compliance requirements. For example, the administrative interface 204 can enable a university administrator to configure a comprehensive computer science curriculum by defining sequential programming courses with language-specific competency requirements, establishing prerequisite relationships between foundational mathematics nodes and advanced algorithm development activities, and authorizing access to specific coding environments and assessment frameworks that align with institutional learning objectives and accreditation standards. As another example, the administrative interface 204 can support a corporate training manager in implementing professional development programs by creating role-specific learning pathways with industry-relevant competency mappings, configuring integration with company-specific tools and knowledge bases, and establishing mentorship connection protocols that automatically trigger when subject users 106 request pathway modifications or demonstrate performance patterns indicating additional support requirements. Additionally, the administrative interface 204 can implement curriculum implementation features that enable admin users 107 to deploy specialized learning programs across different organizational units while maintaining centralized oversight and quality assurance, with version control mechanisms that track curriculum modifications and rollback capabilities that restore previous configurations when deployment issues occur.

In some implementations, the function container 260 can function as a primary organizational component within the administrative interface 204 that groups related administrative functions and provides structured access to content management tools for configuring learning pathway generation and deployment processes. The function container 260 can be implemented as a modular interface framework that includes collapsible section headers with expand/collapse functionality for organizing complex administrative workflows, tabbed navigation systems (e.g., horizontal tab bars with keyboard navigation support, vertical sidebar navigation with hierarchical menu structures, breadcrumb navigation with contextual location indicators, and/or the like) that enable efficient access to different administrative function categories, and contextual help systems (e.g., inline tooltips with explanatory text, modal dialogs with detailed instructions, progressive disclosure with step-by-step guidance, and/or the like) that provide on-demand assistance for complex configuration procedures. The function container 260 can include visual organization elements that utilize consistent styling patterns with color-coded section headers, iconographic representations that provide intuitive recognition of different administrative function types, and progress indicators that display completion status for multi-step configuration workflows involving curriculum development and system integration processes. The function container 260 can implement dynamic content loading mechanisms that fetch relevant administrative tools from the administrative configuration repository 154 based on admin user 107 authorization levels and organizational role assignments, with caching strategies that optimize performance through intelligent prefetching of frequently accessed configuration interfaces and compression algorithms that minimize bandwidth usage for complex administrative dashboards containing multiple interactive components. For example, the function container 260 can organize curriculum management functions by displaying sections for course creation with template selection interfaces, learning objective definition with competency framework alignment tools, and assessment configuration with rubric development utilities, with each section providing expandable access to detailed configuration options while maintaining visual hierarchy through consistent spacing and typography that guides admin users 107 through complex curriculum development workflows. As another example, the function container 260 can structure system integration functions by presenting categories for external API configuration with authentication credential management, data synchronization setup with mapping schema definitions, and user provisioning controls with bulk import capabilities, with each category containing specialized tools that enable admin users 107 to establish connections between the adaptive learning system 100 and organizational infrastructure while maintaining security protocols and data integrity standards. Additionally, the function container 260 can implement customizable layout options that enable admin users 107 to rearrange administrative function groupings based on workflow preferences and organizational priorities, with drag-and-drop interface customization capabilities and saved layout configurations that preserve personalized administrative workspace arrangements across multiple login sessions and device access points.

In some implementations, the sub-function container 262 can function as a specialized administrative component within the function container 260 that provides detailed configuration interfaces for specific operational aspects of the graph generation module 122 and operations management module 123. The sub-function container 262 can be implemented as a focused interface element that includes form-based configuration panels with input validation mechanisms (e.g., real-time field validation with error highlighting, data type checking with format enforcement, range validation with boundary condition testing, and/or the like) for ensuring administrative input accuracy, API endpoint management interfaces (e.g., RESTful service configuration with HTTP method specification, request/response schema definition with JSON validation, authentication parameter setup with token management, and/or the like) that enable programmatic system configuration, and preview capabilities that allow admin users 107 to test configuration changes before deployment to active learning environments. The sub-function container 262 can include specialized configuration tools for managing the operation element map 134 generation processes by providing interface elements that define relationships between interactive elements 160 and recommended operations 136, establish compatibility matrices that determine optimal element-operation pairings based on pedagogical effectiveness metrics, and configure adaptive mapping algorithms that continuously refine element selections based on user performance data collected from session execution data 170. The sub-function container 262 can implement workflow orchestration controls that enable admin users 107 to define complex multi-stage learning sequences with conditional branching logic, configure automated progression rules that determine when subject users 106 advance between memory nodes within the acyclic sequence 212, and establish validation protocols that verify competency achievement before unlocking subsequent learning opportunities. For example, the sub-function container 262 can provide detailed configuration interfaces for programming competency pathways by enabling admin users 107 to specify coding environment requirements with language-specific tool configurations, define automated testing frameworks with custom validation criteria, and establish peer review protocols with rubric-based evaluation systems that ensure consistent assessment standards across different programming languages and complexity levels. As another example, the sub-function container 262 can offer comprehensive setup tools for business leadership development programs by allowing admin users 107 to configure simulation environments with scenario-based decision-making frameworks, establish team collaboration requirements with role assignment mechanisms, and define mentorship matching algorithms that connect subject users 106 with appropriate guidance resources based on career objectives and demonstrated competency levels. Additionally, the sub-function container 262 can implement version control mechanisms that maintain historical records of configuration changes with detailed audit trails, enabling admin users 107 to track modifications over time and implement rollback procedures when configuration adjustments produce suboptimal learning outcomes or system performance issues.

In some implementations, the execution element 264 can function as an interactive testing and validation component within the sub-function container 262 that enables admin users 107 to verify configuration changes and validate system functionality before deploying modifications to active learning environments. The execution element 264 can be implemented as a dynamic interface control that includes sandbox execution environments (e.g., containerized testing instances with isolated resource allocation, virtual machine deployments with snapshot capabilities, cloud-based testing platforms with scalable compute resources, and/or the like) for safe configuration testing, real-time feedback mechanisms that display execution results with detailed logging information, and performance monitoring tools (e.g., response time measurements with statistical analysis, resource utilization tracking with capacity planning insights, error rate monitoring with exception handling reports, and/or the like) that assess system behavior under different configuration scenarios. The execution element 264 can include automated validation protocols that verify configuration integrity by testing API endpoint functionality with comprehensive request/response validation, checking database connectivity with transaction rollback capabilities, and validating user interface rendering with cross-browser compatibility testing across different device types and screen resolutions. The execution element 264 can implement comprehensive testing workflows that simulate subject user 106 interactions with configured learning pathways by executing automated traversal sequences through the acyclic sequence 212, generating synthetic performance data that mimics realistic user behavior patterns, and validating that the graph generation module 122 and operations management module 123 respond appropriately to different user progression scenarios and competency validation events. For example, the execution element 264 can enable admin users 107 to test newly configured data science learning pathways by executing automated sequences that simulate subject users 106 completing programming exercises with code compilation validation, progressing through statistical analysis modules with dataset processing verification, and advancing to machine learning implementation activities with model training and evaluation procedures, with the execution element 264 providing detailed reports on pathway functionality, performance metrics, and potential configuration issues that require administrative attention before curriculum deployment. As another example, the execution element 264 can facilitate testing of collaborative business project configurations by simulating multiple concurrent subject users 106 accessing shared resources, executing team-based decision-making scenarios with conflict resolution protocols, and validating that resource allocation mechanisms function correctly under various load conditions and user interaction patterns. Additionally, the execution element 264 can implement automated regression testing capabilities that continuously validate system functionality when administrative configurations are modified, with scheduled testing procedures that execute comprehensive validation suites and generate alerts when configuration changes introduce unexpected behavior or performance degradation in existing learning pathway functionality.

In some implementations, the parameter selector 266 can function as a configuration interface component within the sub-function container 262 that enables admin users 107 to specify operational parameters and data format requirements for API endpoints and system integration processes. The parameter selector 266 can be implemented as an interactive form element that includes dropdown selection menus with predefined option sets (e.g., data format specifications with JSON, XML, and CSV options, authentication method selections with OAuth, SAML, and API key choices, content type definitions with multimedia format specifications, and/or the like) for standardized parameter configuration, input validation mechanisms that verify parameter compatibility with system requirements and external integration constraints, and dynamic option filtering that adjusts available selections based on previously configured parameters and organizational policy restrictions. The parameter selector 266 can include contextual help features that provide detailed explanations of parameter implications and configuration requirements, with inline documentation that describes how different parameter selections affect system behavior and learning pathway functionality, and example configurations that demonstrate optimal parameter combinations for common administrative scenarios and organizational deployment patterns. The parameter selector 266 can implement intelligent parameter suggestion algorithms that analyze organizational requirements and historical configuration patterns to recommend optimal parameter selections, with machine learning models that identify successful configuration combinations based on system performance metrics and user engagement data collected from previous administrative deployments. For example, the parameter selector 266 can enable admin users 107 to configure API integration parameters for connecting with external Learning Management Systems by providing selection options for authentication protocols with detailed security requirement explanations, data synchronization frequency settings with bandwidth and performance impact descriptions, and content mapping schema selections with field-level compatibility verification that ensures seamless data exchange between the adaptive learning system 100 and institutional infrastructure. As another example, the parameter selector 266 can facilitate configuration of assessment validation parameters by offering selection menus for scoring algorithms with rubric-based evaluation options, threshold adjustment mechanisms with statistical confidence interval settings, and feedback delivery timing configurations with immediate and delayed notification choices that align with pedagogical best practices and organizational assessment policies. Additionally, the parameter selector 266 can implement parameter dependency validation that automatically checks for configuration conflicts and incompatible parameter combinations, with real-time feedback mechanisms that highlight potential issues and suggest alternative parameter selections that maintain system functionality while meeting administrative requirements and organizational constraints.

In some implementations, a function configuration 268 can function as a comprehensive specification interface within the sub-function container 262 that enables admin users 107 to define detailed operational parameters and data structures for system functionality and content management processes. The function configuration 268 can be implemented as a structured data definition interface that includes JSON schema editors with syntax highlighting and validation capabilities (e.g., real-time syntax checking with error highlighting, auto-completion with schema-aware suggestions, format validation with compliance verification, and/or the like) for defining complex configuration objects, template libraries that provide pre-configured schema structures for common administrative scenarios, and import/export functionality (e.g., configuration file upload with validation processing, schema export with documentation generation, backup creation with versioning support, and/or the like) that enables configuration portability across different system deployments and organizational environments. The function configuration 268 can include hierarchical data structure definition tools that enable admin users 107 to specify nested configuration objects with parent-child relationships, define array structures with element validation constraints, and establish reference relationships between different configuration components that maintain data integrity and consistency across complex administrative workflows. The function configuration 268 can implement schema validation mechanisms that verify configuration completeness by checking for required field presence, validate data type consistency with type coercion capabilities, and enforce business rule compliance through custom validation functions that ensure configurations align with organizational policies and pedagogical standards. For example, the function configuration 268 can enable admin users 107 to define comprehensive learning pathway schemas that specify memory node structures with interactive elements 160 assignments and validation criteria, establish prerequisite relationship mappings with dependency resolution algorithms, and configure progression rules with conditional logic that determines when subject users 106 advance through the acyclic sequence 212 based on performance metrics and competency validation results. As another example, the function configuration 268 can facilitate definition of assessment framework configurations that specify rubric structures with weighted scoring criteria, establish peer review protocols with anonymization and bias reduction mechanisms, and configure automated feedback generation systems with natural language processing capabilities that provide personalized guidance based on individual performance patterns and learning objective alignment. Additionally, the function configuration 268 can implement configuration inheritance mechanisms that enable admin users 107 to create base configuration templates with organization-wide default settings and department-specific overrides that customize system behavior while maintaining consistency across different organizational units and user populations within the adaptive learning system 100 deployment.

Figure 3:
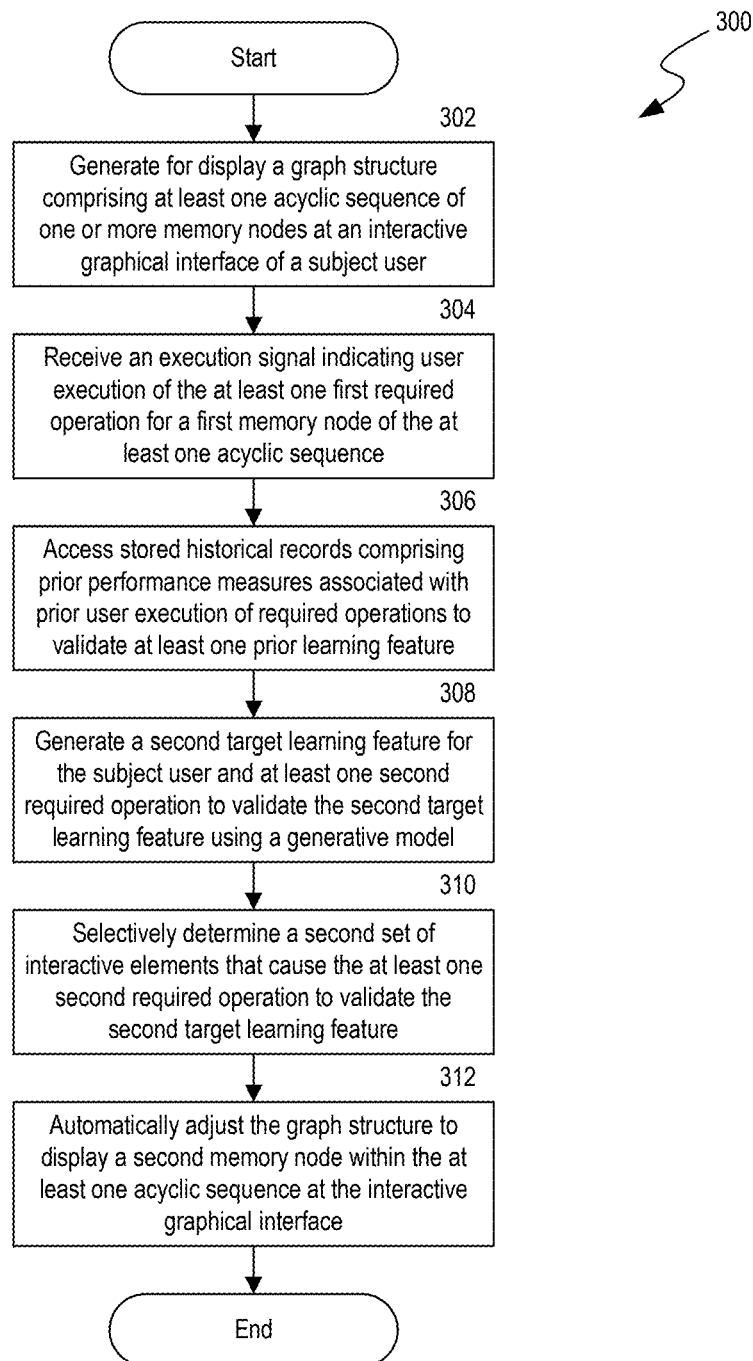
FIG. 3 is a flow diagram that illustrates an example process for dynamic adjustment of graphical interfaces in accordance with some implementations of the disclosed technology.

FIG. 3 is a flow diagram that illustrates an example process 300 for dynamic adjustment of graphical interfaces in accordance with some implementations of the disclosed technology. The process 300 (e.g., computer-implemented method) can be performed by a system (e.g., adaptive learning system 100) configured to dynamically adjust one or memory nodes of a graph structure (e.g., an acyclic sequence of memory nodes within the graph data structure) in response to validating user performance measures for recommended operations associated with select target learning features. In one example, the system includes at least one hardware processor and at least one non-transitory memory storing instructions, which, when executed by the at least one hardware processor, cause the system to perform the process 300. In another example, the system includes a non-transitory, computer-readable storage medium comprising instructions recorded thereon, which, when executed by at least one data processor, cause the system to perform the process 300.

At block 302, the system can generate for display a graph structure comprising acyclic sequences of memory nodes. For example, the system can generate to display (e.g., at a graphical interface of a subject user) at least one acyclic sequence of memory nodes (e.g., visual link between graphical indicators of individual memory nodes), where each memory node can store a set of interactive elements that cause one or more recommended operations to validate a target learning feature (e.g., a competency objective, a performance metric, or the like) for a subject user.

In some implementations, the system can autonomously and dynamically update an interactive graphical interface in response to execution signals and/or user-initiated activity (e.g., monitored user activity via interactive graphical elements, validation signals from external services, or the like). For example, the system can be configured to receive (e.g., via the interactive graphical interface) a user selection of at least one graphical indicator (e.g., a visual symbol, shape, or the like) representing an intermediary memory node within the at least one acyclic sequence of one or more memory nodes. In response to the user selection, the system can automatically generate, or dynamically update, for display (e.g., at the interactive graphical interface) one or more acyclic sequences of memory nodes originating from the intermediary memory node within the at least one acyclic sequence of one or more memory nodes.

In some implementations, the system can receive (e.g., via the interactive graphical interface) a user selection of at least one graphical indicator representing an intermediary memory node within the at least one acyclic sequence of one or more memory nodes. In response to the user selection, the system can automatically adjust (e.g., at the interactive graphical interface) the graph structure to display a limited quantity of memory nodes within a relational proximity of the intermediary memory node. For example, the system can monitor the interactive graphical interface to detect tactile user motion within, or proximate to, a visual representation of the graph structure of memory nodes (e.g., specific movement patterns of hands and/or appendages). The system can map the detected tactile motion to a specific function to modify, or adjust, the display configuration for the graph structure of memory nodes. As an illustrative example, the system can monitor, and detect, a particular movement pattern (e.g., diverging contact points on surface of graphical interface) that is mapped to a function to enhance, or limit, the visual scope of memory nodes, or acyclic sequences of memory nodes, that are displayed (e.g. zooming in, or zooming out, of a visual image or graphics). In response to detecting the foregoing movement pattern, the system can autonomously adjust the displayed graph structure to display greater, or fewer, number of memory nodes associated with the area associated with the detected user motion (e.g., adding, or removing, displayed memory nodes and/or acyclic sequences of memory nodes at the detected motion area). In some implementations, the system can receive (e.g., via the interactive graphical interface) user activation of at least one interactive element from the first set of interactive elements stored by the first memory node. Accordingly, the system can automatically generate, or dynamically update, for display (e.g., at the interactive graphical interface) a third set of interactive elements which, when used by the subject user, cause a portion of the at least one first recommended operation.

In some implementations, the system can generate an initial graph structure of memory nodes based on fundamental characteristic, or seed, parameters and/or attributes associated with the subject user. For example, the system can receive (e.g., via the interactive graphical interface) a seed dataset comprising a first set of descriptive attributes indicating one or more latent learning capacities associated with the subject user and/or a second set of descriptive attributes indicating at least one terminal learning feature for the subject user. The system can use the seed dataset to selectively determine one or more core memory nodes (e.g., starting memory nodes for acyclic sequences of the graph structure). For example, the system can use the first set of descriptive attributes of the seed dataset to determine, or generate, at least one core memory node that stores a predefined set of interactive elements that cause recommended operations, or task events, to validate and/or complete a predefined learning feature (e.g., a standard initial learning feature assigned to subject users). Further, the system can use the second set of descriptive attributes of the seed dataset to generate an ordered sequence of one or more target learning features incrementing from the at least one predefined learning feature to the at least one terminal learning feature. For each target learning feature within the ordered sequence of one or more target learning features, the system can input the first set of descriptive attributes, the second set of descriptive attributes, and the target learning feature into the generative machine learning model to determine one or more recommended operations for validating the target learning feature. Further, the system can generate an intermediary memory node storing a set of interactive elements that cause the one or more recommended operations to validate the target learning feature. The system can further generate for display (e.g., at the interactive graphical interface) an acyclic sequence of memory nodes that sequentially links the intermediary memory nodes of the ordered sequence of one or more target learning features from the at least one core memory node. In some implementations, the generated acyclic sequence of memory nodes can be the at least one acyclic sequence of one or more memory nodes. In some implementations, the first memory node and the second memory node can be intermediary memory nodes of the generated acyclic sequence of memory nodes.

At block 304, the system can receive (e.g., from the interactive graphical interface, an external validation service, or the like) an execution signal indicating user execution of the at least one first recommended operation for a first memory node of the at least one acyclic sequence of one or more memory nodes. In some implementations, the system can receive an execution signal that comprises one or more performance measures associated with usage of the first set of interactive elements for the at least one first recommended operation by the subject user. In some implementations, the one or more performance measures of the first target learning feature can comprise recorded distance metrics between the first target learning feature and a terminal learning feature for the subject user.

In some implementations, the system can receive (e.g., via the interactive graphical interface) a user selection of at least one graphical indicator representing the first memory node within the at least one acyclic sequence of one or more memory nodes. The system can automatically generate, or dynamically update, for display (e.g., at the interactive graphical interface) a sequential arrangement of one or more graphical containers. In some implementations, the system can generate the sequential arrangement such that each graphical container indicates a subset of interactive elements from the first set of interactive elements which, when used or activated by the subject user, cause a portion of the at least one first recommended operation. In some implementations, a priority rating can be assigned to the portion of the at least one first recommended operation associated with each displayed graphical container. In some implementations, the sequential arrangement of the one or more graphical containers can be ordered based, in part, on the priority rating assigned to the portion of the at least one first recommended operation of each displayed graphical container.

In some implementations, the system can generate a new memory node for the at least one acyclic sequence of memory nodes within the graph structure. For example, at block 308, the system can access stored historical records comprising one or more prior performance measures associated with prior user execution of recommended operations to validate at least one prior learning feature. In some implementations, the system can access the stored historical records in response to determining the one or more performance measures satisfy a tolerance threshold for validating the first target learning feature. Further, at block 308, the system can input the one or more performance measures of the first target learning feature and the one or more prior performance measures of the at least one prior learning feature into a generative machine learning model to generate a second target learning feature for the subject user and at least one second recommended operation to validate the second target learning feature.

At block 310, the system can selectively determine a second set of interactive elements that cause the at least one second recommended operation to validate the second target learning feature. Further, at block 312, the system can automatically adjust (e.g., at the interactive graphical interface) the graph structure to display a second memory node within the at least one acyclic sequence of one or more memory nodes, the second memory node storing the second set of interactive elements. In some implementations, the system can input the one or more performance measures of the first target learning feature and the one or more prior performance measures of the at least one prior learning feature into the generative machine learning model to generate a third target learning feature for the subject user and at least one third recommended operation to validate the third target learning feature. Further, the system can selectively determine a third set of interactive elements that cause the at least one third recommended operation to validate the third target learning feature. The system can automatically adjust (e.g., at the interactive graphical interface) the graph structure to display a third memory node within a second acyclic sequence of memory nodes adjacent to the at least one acyclic sequence of one or more memory nodes, the third memory node storing the third set of interactive elements.

In some implementations, the system can access a user account associated with the subject user that stores allocable resources for a digital exchange platform. Accordingly, the system can add a predefined quantity of the allocable resources to the user account when the one or more performance measures satisfy the tolerance threshold.

Example Computing Environment

Figure 4:
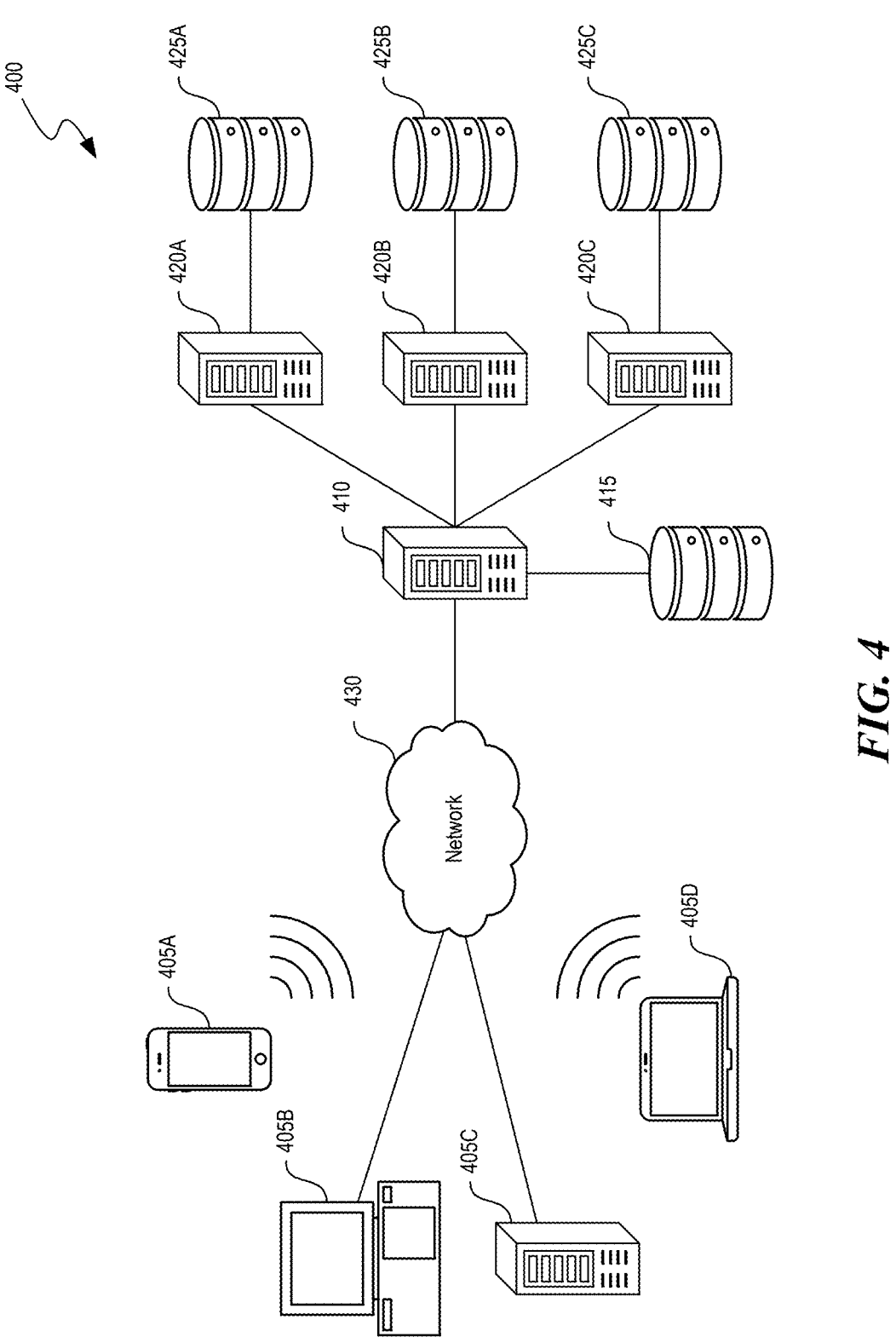
FIG. 4 is a system diagram illustrating an example of a computing environment in which the disclosed system operates in some implementations.

FIG. 4 is a system diagram illustrating an example of a computing environment in which the disclosed system operates in some implementations. In some implementations, environment 400 includes one or more client computing devices 405A-D, examples of which can host the adaptive learning system 100 of FIGS. 1A-1B. Client computing devices 405 operate in a networked environment using logical connections through network 430 to one or more remote computers, such as a server computing device.

In some implementations, server 410 is an edge server which receives client requests and coordinates fulfillment of those requests through other servers, such as servers 420A-C. In some implementations, servers 410 and 420, or associated computing devices, comprise computing systems, such as the adaptive learning system 100 of FIGS. 1A-1B. Though each server 410 and 420, or associated computing device, is displayed logically as a single server, server computing devices can each be a distributed computing environment encompassing multiple computing devices located at the same or at geographically disparate physical locations. In some implementations, each server 420 corresponds to a group of servers.

Client computing devices 405 and servers 410 and 420, or associated computing devices, can each act as a server or client to other server or client devices. In some implementations, servers (410, 420A-C) connect to a corresponding database (415, 425A-C). As discussed above, each server 420 can correspond to a group of servers, and each of these servers can share a database or can have its own database. Databases 415 and 425 warehouse (e.g., store) information such as claims data, email data, call transcripts, call logs, policy data and so on. Though databases 415 and 425 are displayed logically as single units, databases 415 and 425 can each be a distributed computing environment encompassing multiple computing devices, can be located within their corresponding server, or can be located at the same or at geographically disparate physical locations.

Network 430 can be a local area network (LAN) or a wide area network (WAN) but can also be other wired or wireless networks. In some implementations, network 430 is the Internet or some other public or private network. Client computing devices 405 are connected to network 430 through a network interface, such as by wired or wireless communication. While the connections between server 410 and servers 420 are shown as separate connections, these connections can be any kind of local, wide area, wired, or wireless network, including network 430 or a separate public or private network.

Example Machine Learning Architecture

Figure 5:
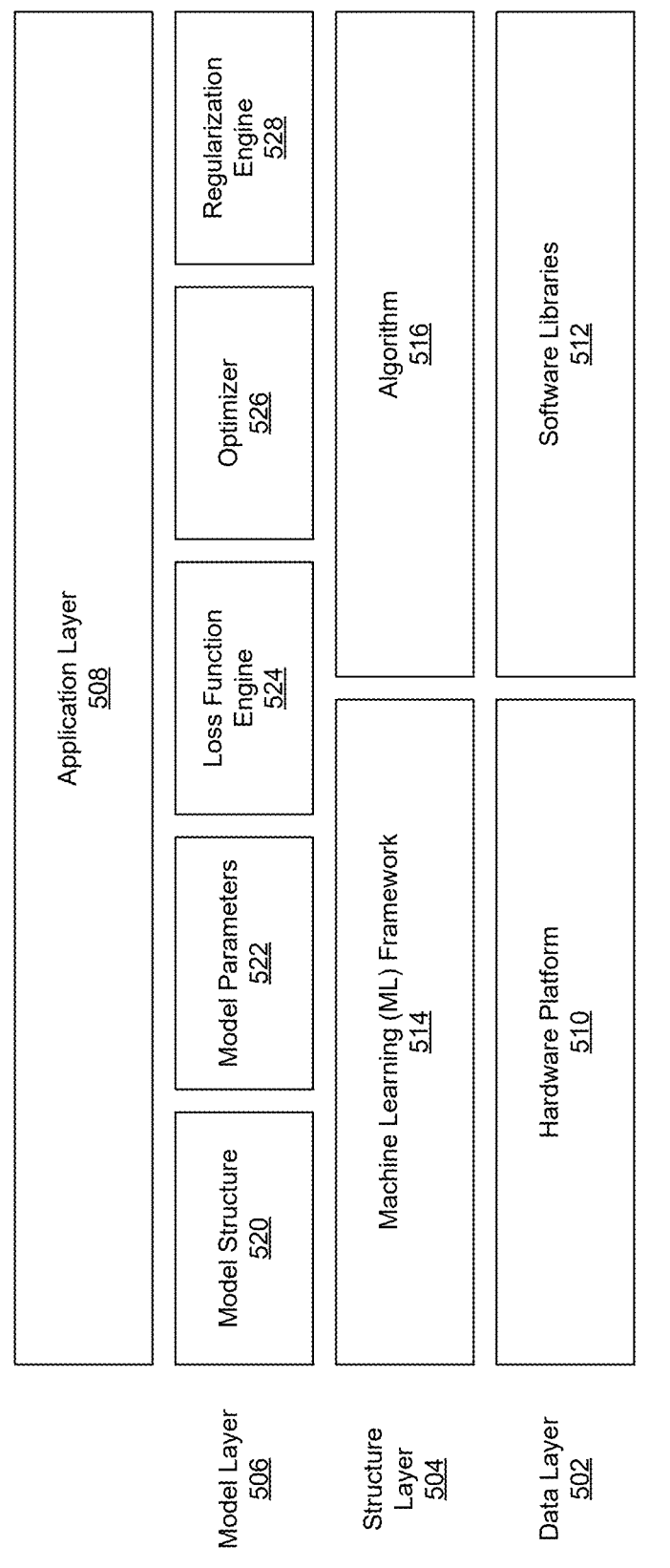
FIG. 5 illustrates a layered architecture of an artificial intelligence (AI) system that can implement the ML models of the adaptive learning system in accordance with some implementations of the present technology.

FIG. 5 illustrates a layered architecture of an artificial intelligence (AI) system 500 that can implement the ML models of the adaptive learning system 100 of FIGS. 1A-1B, in accordance with some implementations of the present technology. Example ML models can include one or more executable statistical inference algorithms stored at computing databases 415, 425 and/or retrieved from external service providers (e.g., a third-party cloud host) via the network 430 of the example computing environment 400. Accordingly, the computing environment 400 and/or components thereof (e.g., servers 410, 420, databases 415, 425, network 430, and/or the like) can include, or be incorporated within, one or more components of the AI system 500. The AI system 500 provides a comprehensive software stack capable of hosting suitable runtime environments for one or more operations of ML models, as further described herein.

As shown, the AI system 500 can include a set of layers, which conceptually organize elements within an example network topology for the AI system's architecture to implement a particular AI model. Generally, an AI model is a computer-executable program implemented by the AI system 500 that analyses input data to generate inferential output data (e.g., a classification label for input feature vectors). Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 4 and 7. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model. The ML framework 514 can include an open-source library, an application programming interface (API), a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. Furthermore, training data can include the custom feature graphs 132, the operation element maps 134, the memory node data 142, the performance records 144, the user profiles 146, the target learning features 148, the interactive elements 160, the session execution data 170, the user configurations 172, and/or the administrative configurations 180 of the adaptive learning system 100 described in relation to FIGS. 1A-1B. The user may label the training data based on one or more classes and trains the AI model by inputting the training data into the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remains in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure

520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cos h loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can be communicatively coupled (e.g., display application data, receive user input, and/or the like) to an interactable user interface of the adaptive learning system 100 of FIGS. 1A-1B.
Example Transformer for Machine Learning Models To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Back-propagation is performed iteratively so that the loss function is converged or minimized. Other techniques for learning the parameters of the ML model may be used. The process of updating (or learning) the parameters over many iterations is referred to as training. Training may be carried out itera-tively until a convergence condition is met (e.g., a pre-defined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applica-tions (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on pub-lically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned param-eters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based lan-guage models are described herein, it should be understood that the present disclosure may be applicable to any ML-based language model, including language models based on other neural network architectures such as recurrent neural network (RNN)-based language models.

Figure 6:
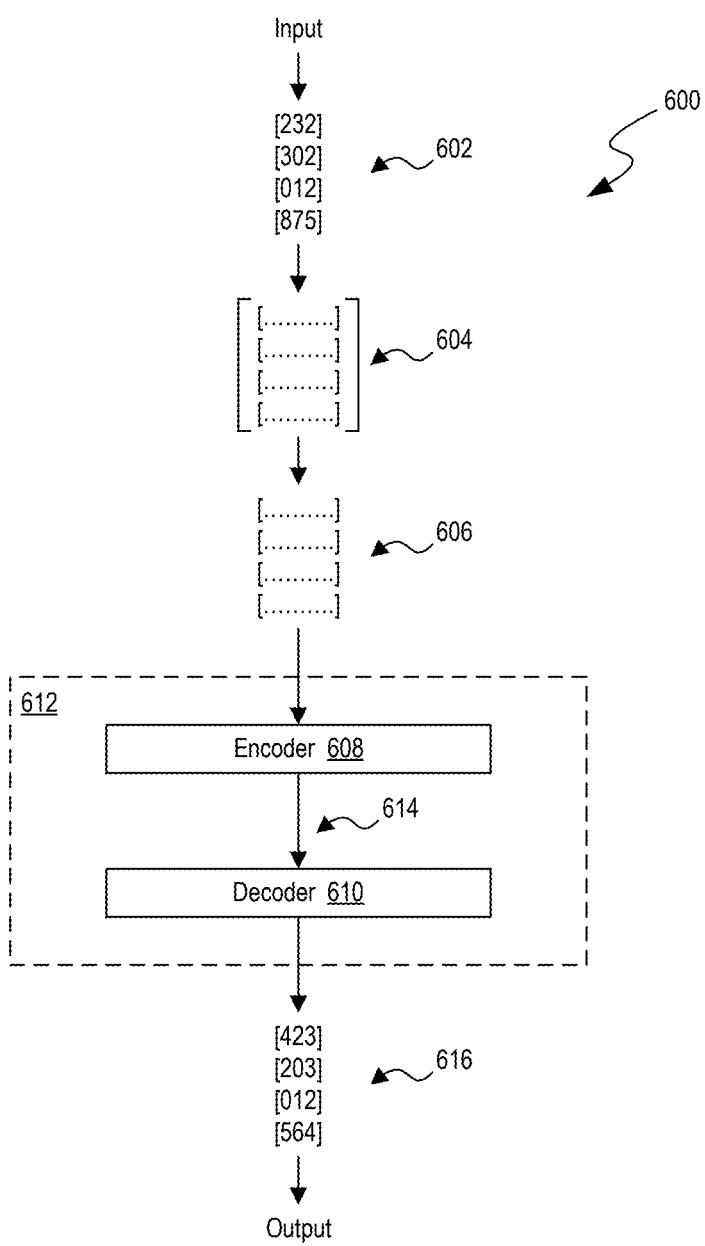
FIG. 6 is a block diagram of an example transformer that can implement aspects of the present technology.

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, includ-ing language models based on other neural network archi-tectures such as recurrent neural network (RNN)-based language models.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural language input. For example, the functions include summarizing existing content, brainstorm-ing ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generat-ing writing in a particular style that could be useful as a starting point for the user's writing. The style can be identified as, e.g., an email, a blog post, a social media post, or a poem. Fixing spelling and grammar can include cor-recting errors in an existing input text. Translating can include converting an existing input text into a variety of different languages. In some embodiments, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural net-work or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write one summary" can be parsed into the segments [write], [one], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "one," and "summary" each correspond to, respectively, a "write" token, an "one" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 7:
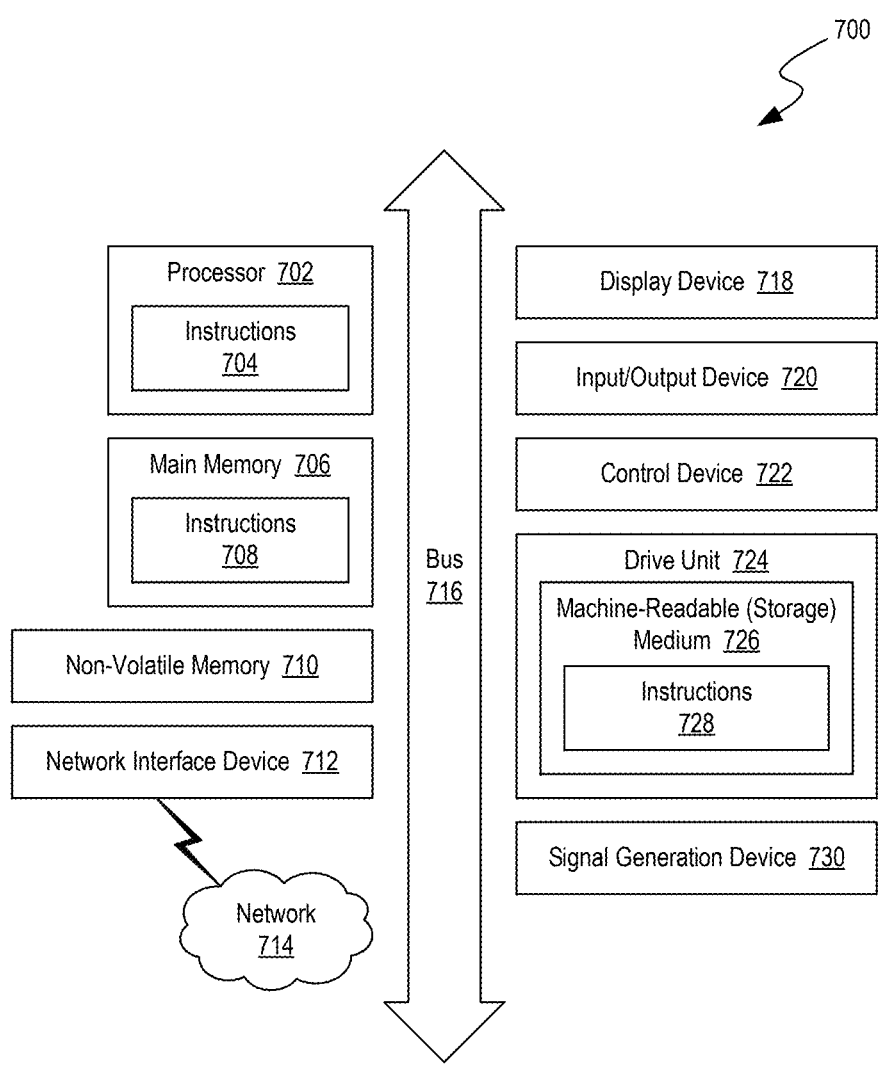
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system, cause the system to:

generate and display, at an interactive graphical interface of a subject user computing device, a graph structure comprising a plurality of concurrently displayed quest lines emanating from a central node representing a subject user by:

generating and displaying a first quest line comprising a first acyclic sequence of a first set of memory nodes, each first memory node in the first set of memory nodes storing a first set of interactive elements that cause at least one first recommended operation to validate a first target learning feature for the subject user; and generating and displaying a second quest line comprising a second acyclic sequence of a second set of memory nodes, each second memory node in the second set of memory nodes storing a second set of interactive elements that cause at least one second recommended operation to validate a second target learning feature of the subject user, wherein the first quest line and the second quest line intersect only at the central node;

receive an execution signal indicating user execution of the at least one first recommended operation for a first memory node of the first set of memory nodes, the execution signal comprising one or more performance measures associated with usage of the first set of interactive elements for the at least one first recommended operation by the subject user;

determine that the one or more performance measures satisfy a tolerance threshold for validating the first target learning feature; and responsive to determining that the one or more performance measures satisfy the tolerance threshold for validating the first target learning feature:

access stored historical records comprising one or more prior performance measures associated with prior user execution of recommended operations to validate at least one prior learning feature;

input the one or more performance measures of the first target learning feature and the one or more prior performance measures of the at least one prior learning feature into a generative machine learning model to generate an additional target learning feature for the subject user and at least one additional recommended operation to validate the additional target learning feature;

selectively determine an additional set of interactive elements that cause the at least one additional recommended operation to validate the additional target learning feature;

automatically adjust, at the interactive graphical interface, the first quest line of the graph structure to selectively reveal an additional memory node within the first set of memory nodes, the additional memory node storing the additional set of interactive elements; and using at least one of a validated first target learning feature and additional target learning feature, generate and selectively reveal at the interactive graphical interface a corresponding learning feature category.

2. The non-transitory, computer-readable storage medium of claim 1, the instructions further cause the system to:

receive, via the interactive graphical interface, a user selection of at least one graphical indicator representing the first memory node in the first set of memory nodes; and automatically generate and display, at the interactive graphical interface, a sequential arrangement of one or more graphical containers, each graphical container indicating a subset of interactive elements from the first set of interactive elements which, when used by the subject user, are configured to cause a portion of the at least one first recommended operation.

3. The non-transitory, computer-readable storage medium of claim 2, wherein a priority rating is assigned to the portion of the at least one first recommended operation associated with each displayed graphical container, and wherein the sequential arrangement of the one or more graphical containers is ordered based, in part, on the priority rating assigned to the portion of the at least one first recommended operation of each displayed graphical container.

4. The non-transitory, computer-readable storage medium of claim 1, wherein the instructions further cause the system to:

receive, via the interactive graphical interface, a user selection of at least one graphical indicator representing an intermediary memory node within the first set of memory nodes; and automatically adjust, at the interactive graphical interface, the graph structure to display a limited quantity of memory nodes within a relational proximity of the intermediary memory node.

5. The non-transitory, computer-readable storage medium of claim 1, wherein the instructions further cause the system to:

receive, via the interactive graphical interface, user activation of at least one interactive element from the first set of interactive elements stored by the first memory node; and automatically generate and display, at the interactive graphical interface, a third set of interactive elements which, when used by the subject user, are configured to cause a portion of the at least one first recommended operation.

6. The non-transitory, computer-readable storage medium of claim 1, wherein the instructions further cause the system to:

receive, via the interactive graphical interface, a seed dataset comprising:

(1) a first set of descriptive attributes indicating one or more latent learning capacities associated with the subject user, and (2) a second set of descriptive attributes indicating at least one terminal learning feature for the subject user;

selectively determine, using the first set of descriptive attributes of the seed dataset, at least one core memory node storing a predefined set of interactive elements that cause recommended operations for at least one predefined learning feature;

generate, using the second set of descriptive attributes of the seed dataset, an ordered sequence of one or more target learning features incrementing from the at least one predefined learning feature to the at least one terminal learning feature;

for each target learning feature within the ordered sequence of one or more target learning features:

input the first set of descriptive attributes, the second set of descriptive attributes, and the target learning feature into the generative machine learning model to determine one or more recommended operations for validating the target learning feature; and generate an intermediary memory node storing a set of interactive elements that cause the one or more recommended operations to validate the target learning feature; and generate and display, at the interactive graphical interface, an acyclic sequence of memory nodes that sequentially links the intermediary memory nodes of the ordered sequence of one or more target learning features from the at least one core memory node.

7. The non-transitory, computer-readable storage medium of claim 6, wherein the generated acyclic sequence of memory nodes is the first acyclic sequence of the first set of memory nodes, and wherein the first memory node and the additional memory node are intermediary memory nodes of the generated acyclic sequence of memory nodes.

8. The non-transitory, computer-readable storage medium of claim 1, wherein the one or more performance measures of the first target learning feature comprises recorded distance metrics between the first target learning feature and a terminal learning feature for the subject user.

9. The non-transitory, computer-readable storage medium of claim 1, wherein the instructions further cause the system to:

access a user account associated with the subject user that stores allocable resources for a digital exchange platform; and add a predefined quantity of the allocable resources to the user account when the one or more performance measures satisfy the tolerance threshold.

10. The non-transitory, computer-readable storage medium of claim 1, wherein the instructions further cause the system to:

generate and display, at the interactive graphical interface, the second quest line by generating a branching sequence comprising (i) a first branch that includes a first subset of nodes in the second acyclic sequence and (ii) a second branch that includes a second subset of nodes in the second acyclic sequence.

11. The non-transitory, computer-readable storage medium of claim 10, wherein the instructions further cause the system to:

generate and display, at the interactive graphical interface, a convergence point that merges the first branch and the second branch.

12. The non-transitory, computer-readable storage medium of claim 11, wherein the instructions further cause the system to:

apply at least two of an animation, a border highlight, or a call to action to the displayed convergence point.

13. The non-transitory, computer-readable storage medium of claim 1, wherein the instructions further cause the system to apply probability data to determine and cache a predicted additional memory node.

14. A system comprising:

at least one hardware processor; and at least one non-transitory memory storing instructions, which, when executed by the at least one hardware processor, cause the system to:

generate and display, at an interactive graphical interface of a subject user computing device, a graph structure comprising a plurality of concurrently displayed quest lines emanating from a central node representing a subject user by:

generating and displaying a first quest line comprising a first acyclic sequence of a first set of memory nodes, each first memory node in the first set of memory nodes storing a first set of interactive elements that cause at least one first recommended operation to validate a first target learning feature for the subject user; and generating and displaying a second quest line comprising a second acyclic sequence of a second set of memory nodes, each second memory node in the second set of memory nodes storing a second set of interactive elements that cause at least one second recommended operation to validate a second target learning feature of the subject user, wherein the first quest line and the second quest line intersect only at the central node;

receive an execution signal indicating user execution of the at least one first recommended operation for a first memory node of the first set of memory nodes, the execution signal comprising one or more performance measures associated with usage of the first set of interactive elements for the at least one first recommended operation by the subject user;

determine that the one or more performance measures satisfy a tolerance threshold for validating the first target learning feature; and responsive to determining that the one or more performance measures satisfy the tolerance threshold for validating the first target learning feature:

access stored historical records comprising one or more prior performance measures associated with prior user execution of recommended operations to validate at least one prior learning feature;

input the one or more performance measures of the first target learning feature and the one or more prior performance measures of the at least one prior learning feature into a generative machine learning model to generate an additional target learning feature for the subject user and at least one additional recommended operation to validate the additional target learning feature;

selectively determine an additional set of interactive elements that cause the at least one additional recommended operation to validate the additional target learning feature; and automatically adjust, at the interactive graphical interface, the first quest line of the graph structure to selectively reveal an additional memory node within the first set of memory nodes, the additional memory node storing the additional set of interactive elements.

15. The system of claim 14 further caused to:

receive, via the interactive graphical interface, a user selection of at least one graphical indicator representing the first memory node in the first set of memory nodes; and automatically generate and display, at the interactive graphical interface, a sequential arrangement of one or more graphical containers, each graphical container indicating a subset of interactive elements from the first set of interactive elements which, when used by the subject user, are configured to cause a portion of the at least one first recommended operation.

16. The system of claim 15, wherein a priority rating is assigned to the portion of the at least one first recommended operation associated with each displayed graphical container, and wherein the sequential arrangement of the one or more graphical containers is ordered based, in part, on the priority rating assigned to the portion of the at least one first recommended operation of each displayed graphical container.

17. The system of claim 14 further caused to:

receive, via the interactive graphical interface, a user selection of at least one graphical indicator representing an intermediary memory node within the first set of memory nodes; and automatically adjust, at the interactive graphical interface, the graph structure to display a limited quantity of memory nodes within a relational proximity of the intermediary memory node.

18. The system of claim 14 further caused to:

receive, via the interactive graphical interface, user activation of at least one interactive element from the first set of interactive elements stored by the first memory node; and automatically generate and display, at the interactive graphical interface, a third set of interactive elements which, when used by the subject user, cause a portion of the at least one first recommended operation.

19. The system of claim 14 further caused to:

access a user account associated with the subject user that stores allocable resources for a digital exchange platform; and add a predefined quantity of the allocable resources to the user account when the one or more performance measures satisfy the tolerance threshold.

20. A computer-implemented method comprising:

generating and displaying, at an interactive graphical interface of a subject user computing device, a graph structure comprising a plurality of concurrently displayed quest lines emanating from a central node representing a subject user by:

generating and displaying a first quest line comprising a first acyclic sequence of a first set of memory nodes, each first memory node in the first set of memory nodes storing a first set of interactive elements that cause at least one first recommended operation to validate a first target learning feature for the subject user; and generating and displaying a second quest line comprising a second acyclic sequence of a second set of memory nodes, each second memory node in the second set of memory nodes storing a second set of interactive elements that cause at least one second recommended operation to validate a second target learning feature of the subject user, wherein the first quest line and the second quest line intersect only at the central node;

receiving an execution signal indicating user execution of the at least one first recommended operation for a first memory node of the first set of memory nodes, the execution signal comprising one or more performance measures associated with usage of the first set of interactive elements for the at least one first recommended operation by the subject user;

determining that the one or more performance measures satisfy a tolerance threshold for validating the first target learning feature; and responsive to determining that the one or more performance measures satisfy the tolerance threshold for validating the first target learning feature, performing operations comprising:

accessing stored historical records comprising one or more prior performance measures associated with prior user execution of recommended operations to validate at least one prior learning feature;

inputting the one or more performance measures of the first target learning feature and the one or more prior performance measures of the at least one prior learning feature into a generative machine learning model to generate an additional target learning feature for the subject user and at least one additional recommended operation to validate the additional target learning feature;

selectively determining an additional set of interactive elements that cause the at least one additional recommended operation to validate the additional target learning feature; and automatically adjusting, at the interactive graphical interface, the first quest line of the graph structure to selectively reveal an additional memory node within the first set of memory nodes, the additional memory node storing the additional set of interactive elements.

\* \* \* \* \*